US012481369B2

(12) United States Patent
Brewer et al.

(10) Patent No.: US 12,481,369 B2
(45) Date of Patent: Nov. 25, 2025

(54) SUPPRESSION OF HAND GESTURES UPON DETECTION OF PERIPHERAL EVENTS ON A PERIPHERAL DEVICE

(71) Applicant: Apple Inc., Cupertino, CA (US)

(72) Inventors: Daniel J. Brewer, San Jose, CA (US); Ashwin Kumar Asoka Kumar Shenoi, San Jose, CA (US); Tian Qiu, Mountain View, CA (US); Leah M. Gum, Sunol, CA (US); David J. Meyer, Menlo Park, CA (US); Julian K. Shutzberg, San Francisco, CA (US); Yirong Tang, San Francisco, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 18/472,818

(22) Filed: Sep. 22, 2023

(65) Prior Publication Data

US 2024/0103635 A1  Mar. 28, 2024

Related U.S. Application Data

(60) Provisional application No. 63/505,883, filed on Jun. 2, 2023, provisional application No. 63/376,945, filed on Sep. 23, 2022.

(51) Int. Cl.
*G06F 3/01* (2006.01)
*G06V 10/764* (2022.01)
*G06V 40/20* (2022.01)

(52) U.S. Cl.
CPC ............ *G06F 3/017* (2013.01); *G06V 10/764* (2022.01); *G06V 40/28* (2022.01)

(58) Field of Classification Search
CPC ...... G06F 3/017; G06V 10/764; G06V 40/28; G06V 40/11
See application file for complete search history.

(56) References Cited

U.S. PATENT DOCUMENTS

| 11,755,124 | B1* | 9/2023 | Stoppa ................ G06F 3/0213 345/168 |
| 2010/0188328 | A1* | 7/2010 | Dodge .................... G06F 3/01 345/156 |
| 2013/0257734 | A1* | 10/2013 | Marti .................... G06F 3/0426 345/168 |
| 2014/0191972 | A1* | 7/2014 | Case ..................... G06F 3/0213 345/168 |
| 2015/0220150 | A1* | 8/2015 | Plagemann ............ G06F 3/017 715/856 |

(Continued)

*Primary Examiner* — Liliana Cerullo
(74) *Attorney, Agent, or Firm* — Blank Rome LLP

(57) ABSTRACT

Suppressing a hand gesture upon detecting peripheral events on a peripheral device includes determining a first hand pose for a first hand a second hand pose for a second hand in response to a detected peripheral device peripheral event, determining, based on the first hand pose and the second hand pose, at least one hand of the first hand and the second hand in a peripheral use mode, detecting an input gesture from a hand of the at least one hand determined to be in the peripheral use mode, and rejecting the input gesture by a user input pipeline in accordance with the determination that the hand is in the peripheral use mode. The presence of a peripheral device is confirmed by activating a computer vision system in response to determining that a peripheral use condition is satisfied.

17 Claims, 12 Drawing Sheets

(56) References Cited

U.S. PATENT DOCUMENTS

| | | | |
|---|---|---|---|
| 2019/0294258 A1* | 9/2019 | Forlines | G06F 3/0202 |
| 2021/0142214 A1* | 5/2021 | Maalouf | G06F 3/017 |
| 2024/0028137 A1* | 1/2024 | Lai | G06F 3/017 |

* cited by examiner

SUPPRESSION OF HAND GESTURES UPON DETECTION OF PERIPHERAL EVENTS ON A PERIPHERAL DEVICE

BACKGROUND

Some devices are capable of generating and presenting extended reality (XR) environments. An XR environment may include a wholly or partially simulated environment that people sense and/or interact with via an electronic system. In XR, a subset of a person's physical motions, or representations thereof, are tracked, and, in response, one or more characteristics of one or more virtual objects simulated in the XR environment are adjusted in a manner that comports with realistic properties. Some XR environments allow users to interact with virtual objects or with each other within the XR environment. For example, users may use gestures to interact with components of the XR environment. However, what is needed is an improved technique to manage gesture recognition and input.

DETAILED DESCRIPTION

Figure 1A:
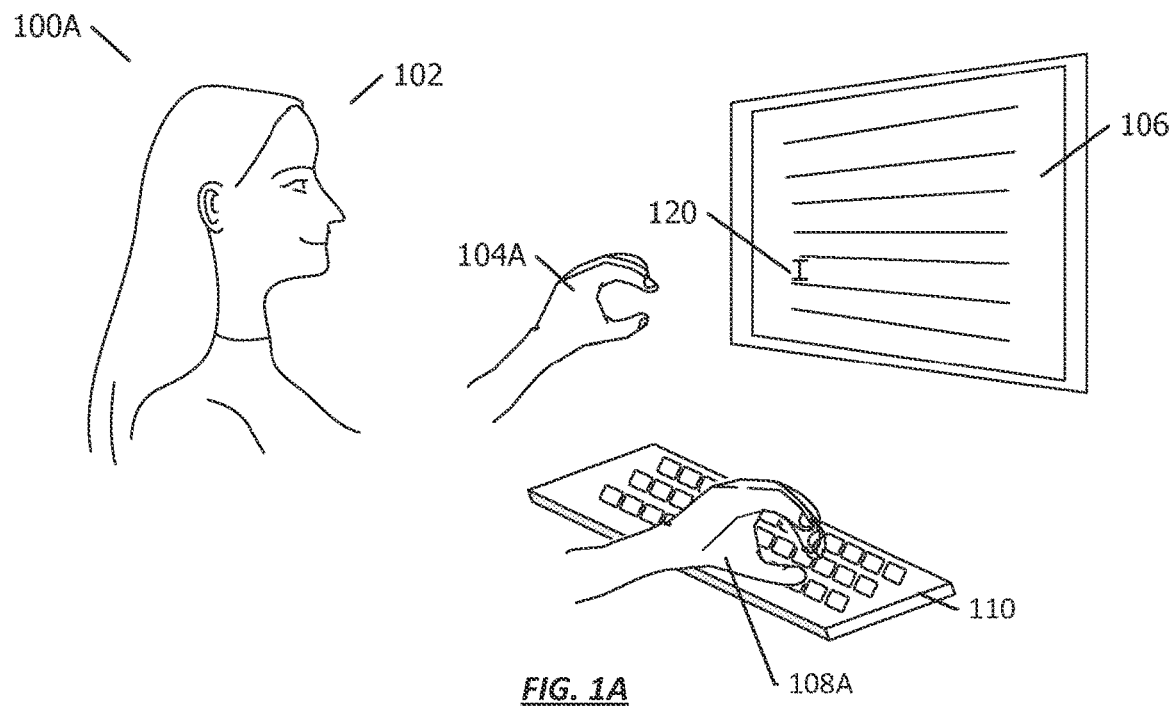
FIGS. 1A-1B show diagrams of a user interacting with a device, in accordance with some embodiments.

This disclosure pertains to systems, methods, and computer readable media to provide and suppress input from hand gestures. In particular, this disclosure pertains to techniques for suppressing user input from hand gestures upon detection of peripheral events on a peripheral device. Further, techniques described herein relate to activating computer vision systems in order to confirm the presence of a peripheral device in a scene.

According to some embodiments, the technique includes, in response to detecting a peripheral event from a peripheral device, obtaining pose information for one or more hands of a user. The hand pose of each hand may be analyzed to determine whether each hand is in a peripheral use mode. A peripheral use mode may indicate a mode of operation in which a hand (or, in some embodiments, both hands) is/are determined to be using a peripheral device and, as such, should not be considered for gesture-based input. For example, if a hand is in a pose such that the palm is parallel to a detected surface in an environment, the hand may be considered to be in a peripheral use mode in some embodiments. As another example, if articulation of the fingers on the hand move in a manner such that typing is likely, then the hand may be considered to be in a peripheral use mode in some embodiments. In response to determining that the hand is in a peripheral use mode, any gestures detected by the hand while in the peripheral use mode may be ignored or otherwise rejected. More particularly, the actions associated with the gesture will be suppressed. Alternatively, in some embodiments, if a hand is not determined to be in a peripheral use mode, it may be considered to be in a gesture use mode, in which case gesture input is allowed and processed from the hand.

In some embodiments, the techniques described herein include cancellation of an initialized user input gesture. In some embodiments, an input gesture may consist of two actions: an initialization phase (when the input gesture is acknowledged by the system), and an action (i.e., the action corresponding to the input gesture is actually performed). For example, an input gesture may be detected by a particular hand within a predefined time period within which a peripheral event is detected for a peripheral device while the particular hand is in a peripheral use mode, according to some embodiments. The gesture may be recognized, and a graphical indication of the recognition may be presented. As an example, if an input gesture is associated with a selection of a user input component on the user interface, the pinch down of a pinch gesture may be graphically represented on a user interface by a change in the presentation of the component. If a peripheral event is detected just after the gesture is detected, and the peripheral event is determined to be caused by the same hand, then the action associated with gesture is canceled. Other components of the input gesture pipeline besides the action may continue, such as the graphical representation of the recognition of the gesture.

In some embodiments, techniques also include using computer vision to confirm the presence of a peripheral device, for example, in response to a determination that a hand is in a peripheral use mode. Identifying the presence and location of a peripheral object can be computationally expensive and power demanding. Thus, according to some embodiments it is preferable to use a lower power technique (such as the determination of the peripheral input mode) to determine the location of the peripheral device in the region. It can be power intensive to run object detection at all times. As such, certain embodiments described herein are directed to triggering object detection in response to a low-power determination that a peripheral device is present. In some embodiments, the low-power tracking technique may initially be used to determine whether a peripheral is in the vicinity. This may include, for example, analyzing data from a hand tracking pipeline, such as hand pose data, image data including one or more hands, and the like. In some embodiments, if a pose or motion of the hand indicates that a peripheral component is likely nearby (for example, if a hand is determined to be in a peripheral input mode), then computer vision systems may be activated to confirm the presence of the peripheral device. Similarly, if a peripheral is detected in the image data from the hand tracking pipeline, then computer vision systems may be activated to confront the presence of the peripheral device. That is, object detection may be performed using a computer vision pipeline to determine the presence of the peripheral device. This may include obtaining additional sensor data, such as depth data, higher resolution image data (i.e., image data captured at a higher resolution than that of the hand tracking pipeline), and the like.

A physical environment refers to a physical world that people can sense and/or interact with without aid of electronic devices. The physical environment may include physical features such as a physical surface or a physical object. For example, the physical environment corresponds to a physical park that includes physical trees, physical buildings, and physical people. People can directly sense and/or interact with the physical environment such as through sight, touch, hearing, taste, and smell. In contrast, an XR environment refers to a wholly or partially simulated environment that people sense and/or interact with via an electronic device. For example, the XR environment may include augmented reality (AR) content, mixed reality (MR) content, virtual reality (VR) content, and/or the like. With an XR system, a subset of a person's physical motions, or representations thereof, are tracked, and, in response, one or more characteristics of one or more virtual objects simulated in the XR environment are adjusted in a manner that comports with at least one law of physics. As one example, the XR system may detect head movement and, in response, adjust graphical content and an acoustic field presented to the person in a manner similar to how such views and sounds would change in a physical environment. As another example, the XR system may detect movement of the electronic device presenting the XR environment (e.g., a mobile phone, a tablet, a laptop, or the like) and, in response, adjust graphical content and an acoustic field presented to the person in a manner similar to how such views and sounds would change in a physical environment. In some situations (e.g., for accessibility reasons), the XR system may adjust characteristic(s) of graphical content in the XR environment in response to representations of physical motions (e.g., vocal commands).

There are many different types of electronic systems that enable a person to sense and/or interact with various XR environments. Examples include head-mountable systems, projection-based systems, heads-up displays (HUD), vehicle windshields having integrated display capability, windows having integrated display capability, displays formed as lenses designed to be placed on a person's eyes (e.g., similar to contact lenses), headphones/earphones, speaker arrays, input systems (e.g., wearable or handheld controllers with or without haptic feedback), smartphones, tablets, and desktop/laptop computers. A head-mountable system may have one or more speaker(s) and an integrated opaque display. Alternatively, a head-mountable system may be configured to accept an external opaque display (e.g., a smartphone). The head-mountable system may incorporate one or more imaging sensors to capture images or video of the physical environment, and/or one or more microphones to capture audio of the physical environment. Rather than an opaque display, a head-mountable system may have a transparent or translucent display. The transparent or translucent display may have a medium through which light representative of images is directed to a person's eyes. The display may utilize digital light projection, OLEDs, LEDs, uLEDs, liquid crystal on silicon, laser scanning light source, or any combination of these technologies. The medium may be an optical waveguide, a hologram medium, an optical combiner, an optical reflector, or any combination thereof. In some implementations, the transparent or translucent display may be configured to become opaque selectively. Projection-based systems may employ retinal projection technology that projects graphical images onto a person's retina. Projection systems also may be configured to project virtual objects into the physical environment, for example, as a hologram or on a physical surface.

In the following description, for purposes of explanation, numerous specific details are set forth in order to provide a thorough understanding of the disclosed concepts. As part of this description, some of this disclosure's drawings represent structures and devices in block diagram form in order to avoid obscuring the novel aspects of the disclosed concepts. In the interest of clarity, not all features of an actual implementation may be described. Further, as part of this description, some of this disclosure's drawings may be provided in the form of flowcharts. The boxes in any particular flowchart may be presented in a particular order. It should be understood, however, that the particular sequence of any given flowchart is used only to exemplify one embodiment. In other embodiments, any of the various elements depicted in the flowchart may be deleted, or the illustrated sequence of operations may be performed in a different order, or even concurrently. In addition, other embodiments may include additional steps not depicted as part of the flowchart. Moreover, the language used in this disclosure has been principally selected for readability and instructional purposes and may not have been selected to delineate or circumscribe the inventive subject matter, or resort to the claims being necessary to determine such inventive subject matter. Reference in this disclosure to "one embodiment" or to "an embodiment" means that a particular feature, structure, or characteristic described in connection with the embodiment is included in at least one embodiment of the disclosed subject matter, and multiple references to "one embodiment" or "an embodiment" should not be understood as necessarily all referring to the same embodiment.

It will be appreciated that in the development of any actual implementation (as in any software and/or hardware development project), numerous decisions must be made to achieve a developer's specific goals (e.g., compliance with system- and business-related constraints) and that these goals may vary from one implementation to another. It will also be appreciated that such development efforts might be complex and time-consuming but would nevertheless be a routine undertaking for those of ordinary skill in the design and implementation of graphics modeling systems having the benefit of this disclosure.

Figure 1B:
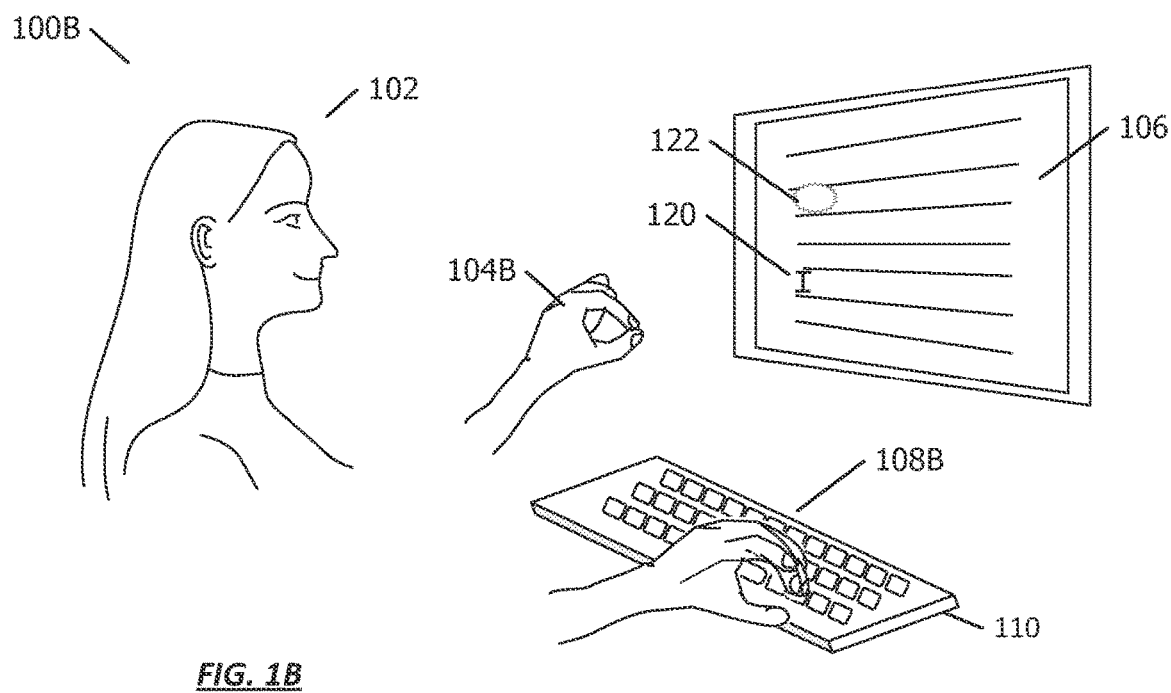

FIGS. 1A-B show a system setup for a user interacting with a device, in accordance with some embodiments. It should be understood that the various features and description of FIGS. 1A-B are provided for illustrative purposes and are not necessarily intended to limit the scope of the disclosure.

In FIG. 1A, a system setup 100A is provided in which a user 102 is viewing a display device 106. In particular, FIG. 1A depicts an example of a user 102 having a first hand 104A free to perform an input gesture, and a second hand 108A utilizing an input device 110 to cause user input at a cursor location 120 on a user interface presented on the display device 106. According to some embodiments, an input mode may be determined for each hand. For example, based on tracking data and/or other captured data, a determination may be made regarding whether each hand is in a peripheral use mode or a gesture input mode. The determination may be made based on a variety of data. This data may include, for example, hand tracking data, gaze data, user interface (UI) data, or some combination thereof. For example, the various input data may be applied to a trained network which is configured to determine or predict an input mode for each hand (or, alternatively, determine whether or not the hand is in a peripheral use mode). As another example, various characteristics of the hand tracking data, gaze data, and/or UI data may be considered as heuristics and to a determination as to whether one or more hands is in a peripheral use mode.

According to some embodiments, the various input signals may be obtained from an electronic system in the system set of 100A. The electronic system may include, for example, a computing device, mobile device, wearable device, Internet of Things (IoT) device, image capture device, or some combination thereof. The electronic system may be used for hand tracking, for which hand tracking data is obtained. The hand tracking data may include, for example, image data of one or more hands, depth data of one or more hands, movement data of one or more hands, or the like. In some embodiments, this image data may include a cropped image of the hand in the environment from which characteristics of the hand may be determined. Hand tracking data may indicate, for example, whether a user's hand pose, movement, and/or location is indicative of a user using a peripheral device or gesture input.

Similarly, the electronic system may be configured to perform gaze tracking, or otherwise obtain gaze information. The gaze data may indicate a direction at which the user 102 is gazing, such as in the form of the gaze vector. In some embodiments, the gaze data may include additional information, such as pupil location, eye location, and the like. Gaze data may be used, for example, to determine whether a target of the users gaze on a user interface corresponds to user input from a gesture and/or peripheral device. As such, gaze data may be considered when training a network to predict whether a hand is in a peripheral use mode, or may be used as a heuristic determining whether a hand is in a peripheral use mode for gesture input mode.

In some embodiments, characteristics of the user interface may be considered for determining a mode for a given hand. For example, if a user interface includes user selectable components which are compatible with gesture input, then a hand is more likely to be in a gesture input mode. By contrast, if the user interface is a text editor, or belongs to an application reliant on a particular peripheral, then a peripheral use mode is more likely. Again, these determinations may be baked into the trained network, or may be used as heuristics for the determination of the mode.

Peripheral device 110 is depicted as a keyboard. However, it should be understood that any kind of peripheral device that has user input capabilities may be utilized as described herein. Examples of peripheral devices include, for example, keyboards, trackpads, computer mice, digitizers, styluses, joysticks, and the like. In addition, these peripheral devices may include virtualized components, such as a keyboard on a touchscreen, or the like. As such, peripheral devices may provide user input via mechanical means, optical means, digital means, or the like.

Based on the various inputs, a determination may be made for each hand regarding an input mode. For example, hand 104A is in a pose that is not likely to be associated with the use of a peripheral device. As such, in some embodiments, hand 104A may be considered to be in a gesture input mode. Accordingly, a gesture input may be accepted when a gesture is performed by hand 104A. By contrast, hand 108A is in a peripheral use mode because its pose is associated with peripheral input and is positioned proximate to peripheral device 110. In some embodiments, a determination of a peripheral use mode for one hand may be applied to both hands. Alternatively, a different mode may be determined for each hand.

In accordance with some embodiments described herein, whether or not the hand or hands are in a peripheral use mode may be determined without any visual data regarding the peripheral device. That is, even if a view of the peripheral device 110 is not captured by the electronic system, it may be determined that the pose of the hand 108A, with the palm facing downward and the fingers arched downward, may be compatible with use of a peripheral device, such as a keyboard, mouse, trackpad, or the like.

In response to a determination that a hand is likely in a peripheral use mode, in some embodiments, execution of computer vision techniques can be triggered to confirm the presence of a peripheral device in the scene. For example, the hand tracking network may use image information including a hand to determine characteristics of the hand. If the pose of the hand indicates that it is likely interacting with a peripheral device, the system can be triggered to perform object detection on the image information. This information may include a cropped image of the hand in the scene, which can include portions of the environment immediately surrounding or proximate to the hand. Accordingly, object detection performed on the images can identify whether a keyboard or other peripheral device is located behind the hand by analyzing a portion of the peripheral device that is visible in the hand crop.

FIG. 1B shows an alternate view of the system set up 100B. Here, user 102 performs a pinch gesture with hand 104B, while hand 108B remains in the peripheral use mode. In some embodiments, the electronic system may determine that because hand 104B is in a gesture input mode, then user input actions associated with the gesture are allowed. As such, an input representation 122 is presented on the display device 106.

Notably, because the hand 108B may be performing input actions on the peripheral device 110 while the hand 104B is performing a user input gesture, a determination may be made as to whether the gesture 104B is intentional. In some embodiments, this determination may be made in response to detecting a peripheral event on a peripheral device. A peripheral event may be considered an input event by a user interacting with the associated peripheral device. In some embodiments, the peripheral device may be a part of the electronic system providing hands tracking data, gaze data, and the like. Thus, the peripheral event may be detected based on the electronic system receiving user input via the peripheral device. Alternatively, the peripheral device may be part of a second system. In this example, the peripheral event may be detected based on the electronic system monitoring the user interface for input, or monitoring the peripheral device for peripheral events. In yet another example, the peripheral device may be communicatively connected to the electronic system such that the peripheral device transmits the notification when a peripheral event occurs.

In response to detecting a peripheral event, the electronic system may determine that the hand associated with the peripheral event is in a peripheral use mode. While in the peripheral use mode, gesture input may be suppressed when recognized as being performed by either hand. However, in some embodiments, the input mode may be specific to a single hand. As such, gesture input may be allowed by a different hand, if that hand is determined not to be in a peripheral use mode (for example, if the hand is in a gesture input mode). Thus, continuing with the example shown in FIG. 1B where hand 108B is in the peripheral use mode and hand 104B is in a gesture input mode (or non-peripheral use mode), gesture input by hand 108B would be suppressed while gesture input by hand 104B would be recognized.

Figure 2:
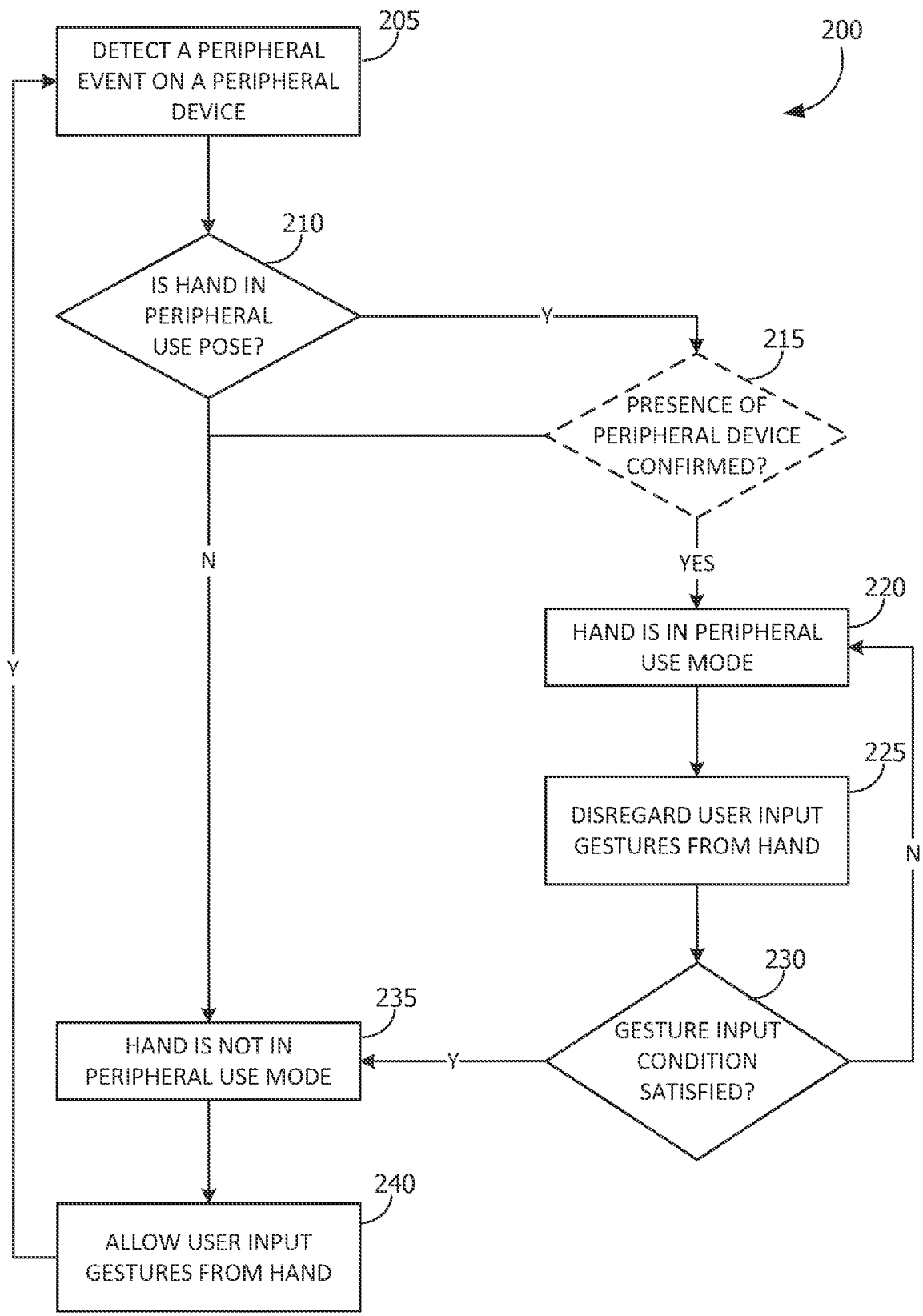
FIG. 2 shows a flowchart of a technique for entering a peripheral use mode, in accordance with some embodiments.

Turning to FIG. 2, the flowchart is presented of a technique for determining whether a hand is in peripheral use mode. In particular, FIG. 2 describes a process for suppressing hand gestures upon detection of peripheral events on a peripheral device. Although the various processes depict the steps performed in a particular order and may be described as being performed by particular components, it should be understood that the various actions may be performed by alternate components. In addition, the various actions may be performed in a different order. Further, some actions may be performed simultaneously, and some may not be required, or others may be added.

The flowchart 200 begins at block 205, where the peripheral event is detected on peripheral device. As described above, the peripheral device may include, for example, keyboards, trackpads, styluses, joysticks, computer mice, touchscreens, or any combination thereof or other similar input components. In addition, the peripheral devices may be configured to provide user input the of mechanical means, optical means, digital means, or the like. Thus, the peripheral devices may be physical components, or may be computer-generated components presented on the screen, for example, a keyboard presented on a touchpad.

The peripheral event may be detected in a variety of ways. For example, if the tracking system includes the peripheral device, then the system may detect that user input is received via a particular peripheral device. As another example, the system may receive an indication that a hit event has occurred, or may monitor a scene (for example, using image data, depth data, or the like) to determine whether a hit event has occurred at the peripheral device. That is, the detection of the event may occur actively or passively depending upon a communicable relationship between the system and the peripheral device.

Turning to block 210, a determination is made as to whether the hand is in a peripheral use mode. In some embodiments, the determination may be made using heuristics, a trained network, or the like. For example, in some embodiments, hand tracking information may be passed to a network trained to predict whether a hand is in a pose consistent with the use of a peripheral device. Additionally, or alternatively, other signals may be used for the determination, such as gaze detection, UI characteristics, or the like.

If a determination is made at block 210 that a particular hand is in a peripheral use pose, then, optionally, at block 215, a determination is made as to whether the presence of a peripheral device is confirmed. For example, object tracking or other computer vision techniques may be initiated by the system to determine whether a peripheral device is present. Examples of activating the object tracking to confirm the presence of a peripheral device will be described in greater detail below with respect to FIG. 6. If the presence of the peripheral device is confirmed, then the flowchart continues to block 220, where the hand is considered to be in a peripheral use mode. According to some embodiments, in the peripheral use mode, the user input from the hit events is processed through a user input pipeline, for example. Meanwhile, at block 225, user input gestures from the hand are rejected or otherwise disregarded. That is, if the hand is in a peripheral use mode, then it is determined that any gestures that happened to be detected during the use of the peripheral device are unintentional, and thus are not acted upon. In some embodiments, the user input gesture may be recognized, but an action associated with the input gesture may not be performed. This may occur, for example, when a gesture input is cancelled, as will be described in greater detail below with respect to FIG. 4.

The flowchart continues to block 230, where a determination is made as to whether a gesture input condition is satisfied. Said another way, a determination may be made as to whether a hand should continue to be considered in the peripheral use mode. This determination may be made, for example, based on the expiration of a timeout period, in response to a predetermined movement or movement satisfying a predetermined threshold, or the like. For example, the gesture input condition may include a timeout condition for the peripheral use mode that is predefined. This timeout condition may indicate a time period after a hit event is detected and the hand is determined to be in peripheral use mode when the hand is no longer considered to be in peripheral use mode. That is, a new input mode determination may be required to keep a hand in a peripheral use mode. Accordingly, if a gesture input condition is not satisfied, then the flowchart 200 returns to block 220, and the hand continues to be considered to be in a peripheral use mode. Alternatively, if a determination is made that the gesture input condition is satisfied, then the flowchart continues to block 235 where the hand is considered to not be in peripheral use mode, and is now in a gesture input mode, for example.

Returning to block 210, if the hand is determined to not be in a peripheral use pose (and, optionally, if the presence of the peripheral device is not confirmed), the flowchart also proceeds to block 235. At block 235, the hand is considered to not be in peripheral use mode. In some embodiments, the hand may be considered to be in a gesture input mode. As such, as shown at block 240, user input gestures are allowed from the hand because the hand is not in peripheral use mode.

Figure 3:
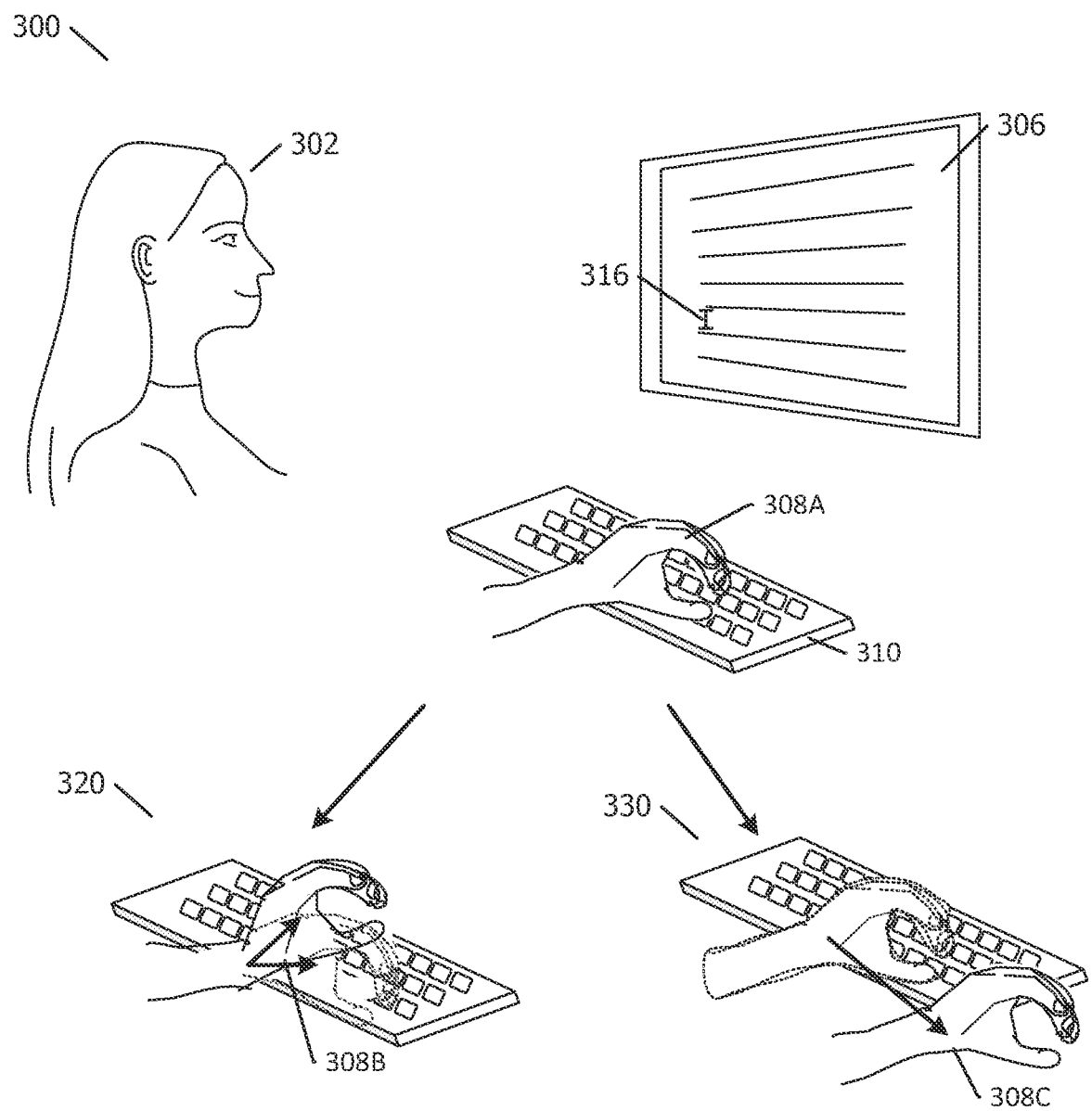
FIG. 3 shows an example diagram for exiting a peripheral use mode, in accordance with some embodiments.

As mentioned above, the hand may exit a peripheral use mode in a variety of conditions. As an example, a timeout condition may indicate when gesture input is again accepted by the hand. As another example, a predefined movement, or a movement otherwise satisfying a gesture input threshold may cause the hands to exit the peripheral use mode. FIG. 3 shows an example diagram for exiting a peripheral use mode, in accordance with some embodiments.

In FIG. 3, a system setup 300 is provided in which a user 302 is viewing a display device 306. In particular, FIG. 3 depicts an example of a user 302 having a hand 308A utilizing an input device 310 to cause user input at a cursor location 316 on the display device 306.

As described above, a hand may exit the peripheral use mode in a variety of ways, such as after a change in hand pose, a timeout period, or based on a movement that satisfies an exiting condition. FIG. 3 depicts two examples of such movement. At diagram 320, the hand 308B is depicted as rotating at the wrist at the degree that satisfies a movement threshold to cause the hands to move a certain degree away from its current pose, thereby exiting the peripheral use mode. As such, in diagram 320, gesture input may be received and processed from 308B to allow the user 302 to interact with the user interface on display device 306. The wrist movement may be determined to satisfy a movement threshold, for example, based on tracking information for the hand pose. For example, a vector originating at the wrist and following through the hand may be tracked for a change in direction. Accordingly, as shown at 308B, the wrist vector rotates a predetermined amount. As another example, this rotation may be determined based on a relationship between a forearm vector and a wrist vector such that the rotation identified by the relationship satisfies a movement threshold.

As another example, diagram 330 shows the hand 308C moving such that a translation from the original hand location to the new location satisfies a movement threshold. This translation may be determined by a relative location of the hand in 3D space. For example, a centroid of the hand, a wrist location, or some other location of a hand may be tracked over a series of frames to determine whether a threshold distance is satisfied. This threshold distance may be determined based on a type of peripheral device, if available. For example, the distance to exit from the peripheral use mode on a track pad may be smaller than on a full keyboard. As another example, the threshold condition may be based on a velocity of the hand movement, acceleration, direction, or some combination thereof. In some embodiments, the hand tracking pipeline may provide such location information, which can be compared across frames to determine whether the movements threshold is satisfied. Accordingly, in diagram 330, if the hand 308C is determined to be performing an input gesture, that input gesture will be processed and used to interact with the user interface on display device 306.

Figure 4:
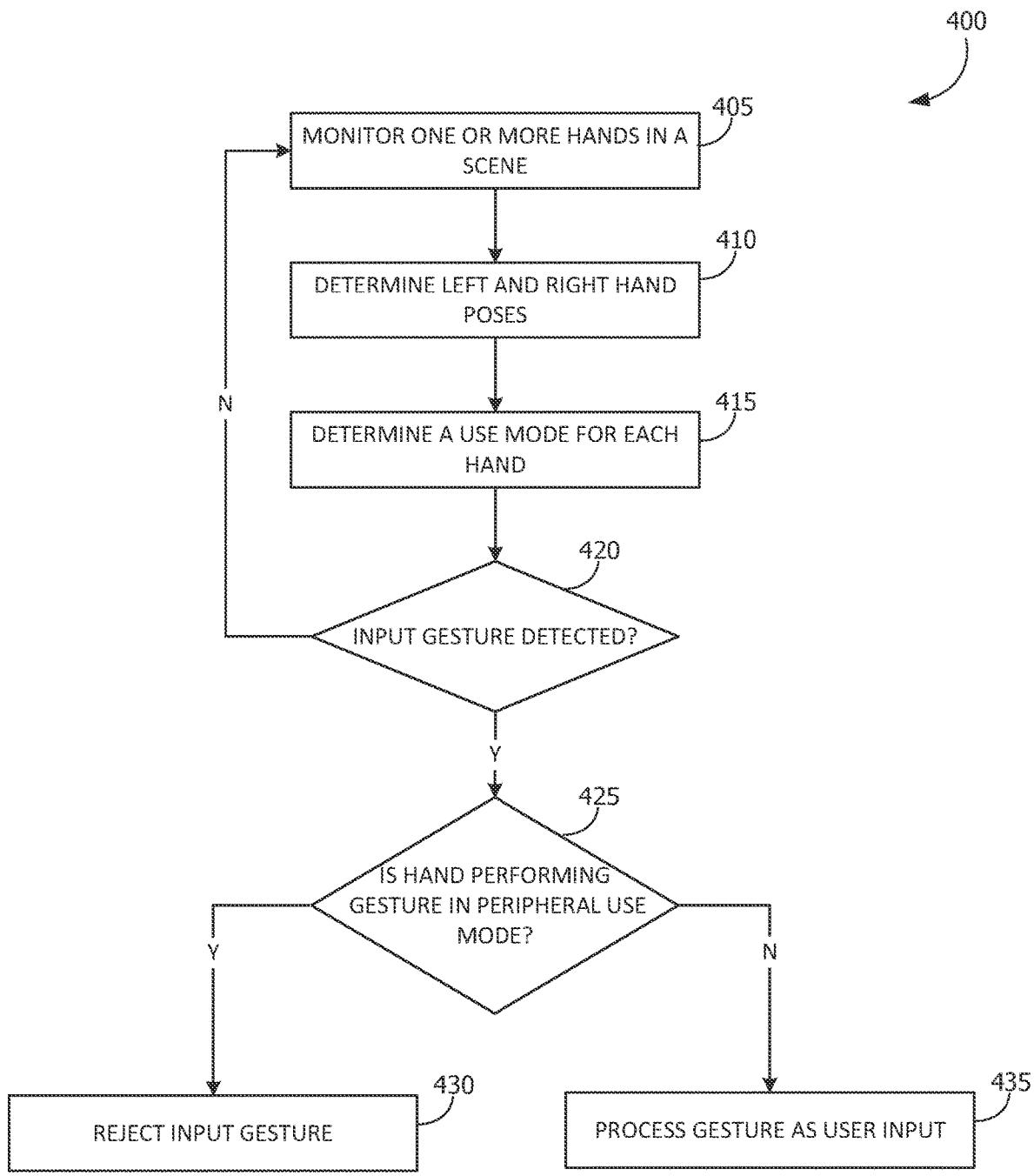
FIG. 4 shows a flowchart of a technique for processing user input, in accordance with some embodiments.

The determination of whether a hand is in a peripheral use mode may occur in real time as a user interacts with a user interface. As such, when input gesture is detected, how those gestures are processed depends on a current input mode of the hand performing the gesture. FIG. 4 shows a flowchart of a technique for processing user input, in accordance with some embodiments. Although the various processes depict the steps performed in a particular order and may be described as being performed by particular components, it should be understood that the various actions may be performed by alternate components. In addition, the various actions may be performed in a different order. Further, some actions may be performed simultaneously, some may not be required, or others may be added.

The flowchart 400 begins at block 405, where one or more hands are monitored in the scene. The hands may be monitored, for example, based on a hand tracking module or the like. As such, hands may be monitored for image data, pose, depth, movement, or the like. At block 410, left- and right-hand poses are determined. The poses may include pose information, hand movement, or the like. For instance, the poses may include data from which a use mode may be determined, as shown at block 415.

Determining the type of mode for each hand may include determining whether a hand is in a peripheral use mode, or a gesture input mode. In some embodiments, the determination is made for both hands together. However, in other embodiments, the determination is made for each hand separately. For example, both hands may be considered in a peripheral use mode based on a combination of the hand poses. For example, a determination may be made as to hand orientation (such as palm orientation), finger articulation, a distance between the hands, a relationship between the hands and a surface in the environment, some combination thereof, or any other method discussed herein. In some embodiments, similar heuristics may be used to determine whether the hands are in a gesture input mode.

The flowchart 400 continues at block 420, where a determination is made as to whether an input gesture is detected. The input gesture may be detected, for example, from a hand tracking pipeline. That is, the hand tracking pipeline may provide hands data from which a determination may be made whether the hand is performing a predetermined gesture associated with user input. The input gesture may be detected from either hand in some embodiments. If no gestures detected, the flowchart returns to block 405, and the one or more hands are continuously monitored in the scene.

Returning to block 420, if a determination is made that the gesture is detected, then the flowchart proceeds to block 425, and a determination is made as to whether the hand performing the gesture is in a peripheral use mode. As described above, in some embodiments, each hand may be associated with a unique use mode. As such, whether the gesture is recognized from a hand in a peripheral use mode or not affects how the input gesture is processed. Thus, if a determination is made at block 425 that the hand performing the gesture is in a peripheral use mode, then the flowchart continues to block 430. At block 430, the input gesture is rejected or otherwise ignored. That is, the input gesture may be ignored by the gesture pipeline such that the action associated with the gesture is not performed, or cancelled/recalled, by the system. By contrast, returning to block 425, if a determination is made that the hand performing the gesture is not in a peripheral use mode (and thus in the gesture input mode for example), the flowchart concludes at block 435, and the gesture is processed as user input. As such, the detected gesture is only processed as user input when the hand performing the gesture is not in a peripheral use mode.

Figure 5:
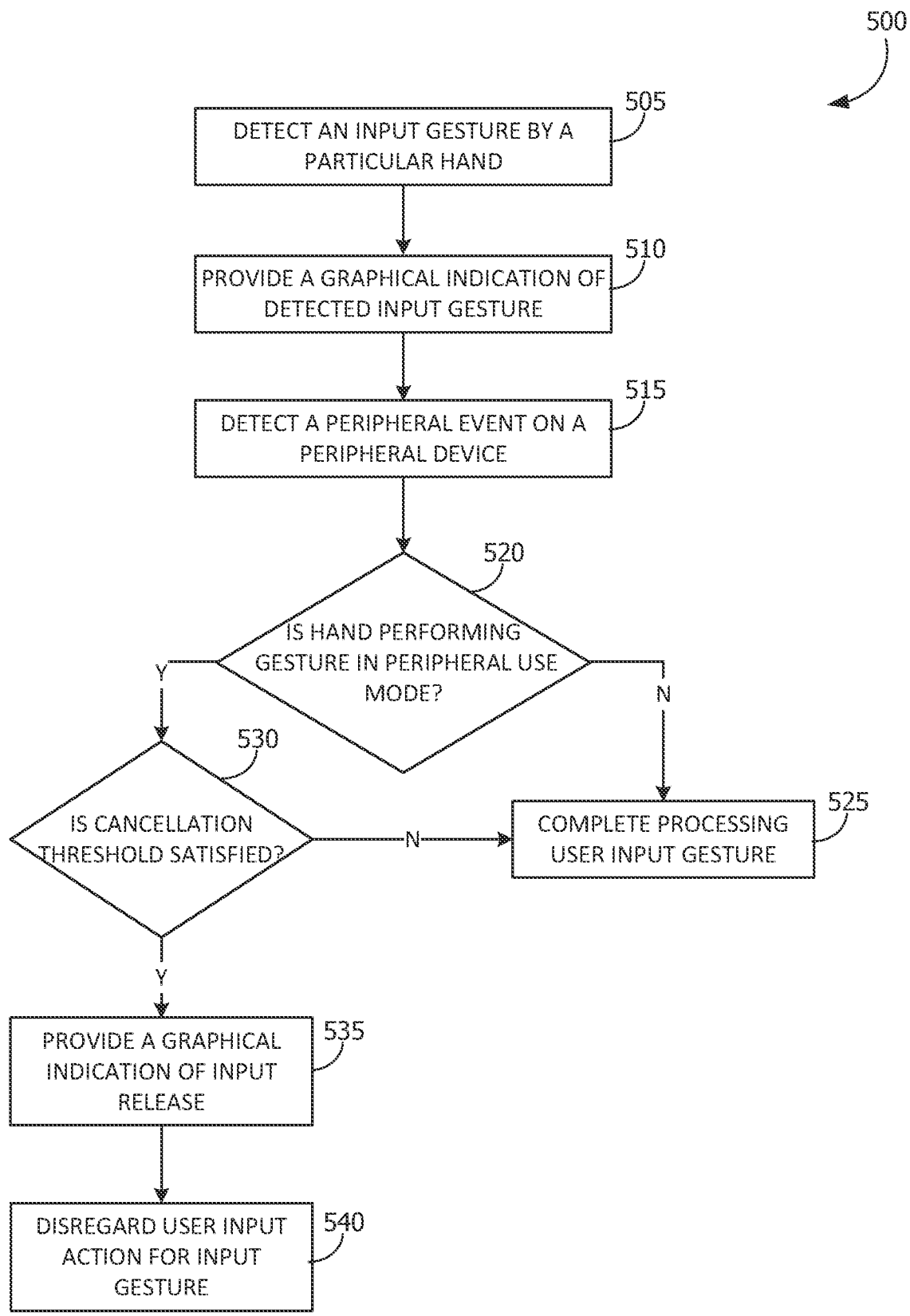
FIG. 5 shows a flowchart of a technique for cancelling an input gesture action, in accordance with some embodiments.

In some instances, a determination of an input mode and a detection of a hit event may occur in close succession to each other, making it difficult to determine whether an input gesture was intended, or was accidental. As an example, a user may accidentally perform a user input gesture in the process of performing a hit event on a peripheral device. FIG. 5 shows a flowchart of a technique for cancelling an input gesture action, in accordance with some embodiments. Although the various processes depict the steps performed in a particular order and may be described as being performed by particular components, it should be understood that the various actions may be performed by alternate components. In addition, the various actions may be performed in a different order. Further, some actions may be performed simultaneously, some may not be required, or others may be added.

The flowchart 500 begins at block 505, where an input gesture is detected by a particular hand. The input gesture may be detected, for example, from a hand tracking pipeline. That is, the hand tracking pipeline may provide hands data from which a determination may be made whether the hand is performing a predetermined gesture associated with user input. The input gesture may be detected from either hand, according to some embodiments. This may occur during an initialization phase of an input gesture.

The flowchart 500 continues to block 510, where a graphical indication of the detected input gesture is presented on a user interface. This may occur, for example, when a gesture begins, but an action associated with the gesture is yet to be activated. As an example, a pinch gesture may be associated with a pinch down action and a pinch up action. In some embodiments, the pinch gesture may be detected in response to the pinch down (i.e., when two fingers are determined to make contact), but an action associated with the gesture may not be activated until the pinch up is detected (i.e., when the two touching fingers are determined to pull away from each other). Accordingly, the graphical indication may provide a visual representation when the pinch down is detected, indicating that the gesture is recognized, while not performing an action associated with that gesture. For example, if the input gesture is associated with selection of a 3D user input component, that component may be highlighted/flattened in response to the pinch down, but may not be selected until the pinch up is detected.

The flowchart 500 continues at block 515, where the hit event is detected on a peripheral device. As described above, the peripheral device may include, for example, keyboards, trackpads, styluses, joysticks, computer mice, touchscreens, or any combination thereof or other similar input components. In addition, the peripheral devices may be configured to provide user input the of mechanical means, optical means, digital means, or the like. Thus, the input components may be physical components, or may be computer-generated components presented on the screen, for example, a keyboard presented on a touchpad.

The hit event may be detected in a variety of ways. For example, if the system includes the peripheral device, then the system may detect that user input is received via a particular peripheral device. As another example, the system may receive an indication that a hit event has occurred, or may monitor a scene (for example, using image data, depth data, or the like) to determine whether a hit event has occurred using the peripheral device. That is, the detection of the event may occur actively or passively depending upon a communicable relationship between the system and the peripheral device.

The flowchart 500 continues to block 520, where a determination is made as to whether the hand performing the gesture is in a peripheral use mode. Whether the hand is in a peripheral use mode may be determined in a variety of ways, as described above with respect to FIG. 2. If the hand is determined to not be in a peripheral use mode, the flowchart concludes at block 525, and the user input gesture is processed to completion. That is, the action associated with the user input gesture is performed. In some embodiments, this may include determining whether a peripheral device is proximate to the hand. A determination as to whether a peripheral device is located proximate to a hand may be performed as described below with respect to FIG. 6.

Returning to block 520, if a determination is made that the hand performing the gesture is in a peripheral use mode, the flowchart continues to block 530. At block 530, a determination is made as to whether a cancellation threshold is satisfied. The cancellation threshold may indicate a set of heuristics that satisfies such threshold. As another example, whether the cancellation threshold is satisfied may be determined by a trained network. The cancellation threshold may indicate that the input gesture that was detected was not completed, or was unintentional. As an example, the cancellation threshold may be determined to be satisfied based on a determination that the hand performing the gesture is in a peripheral use mode within a threshold number of frames, a threshold period of time, or the like. The various thresholds may be predetermined, and may be consistent throughout use of the system, or may vary based on user preference, application configuration, system configuration, or the like. If a determination is made at block 530 that the cancellation threshold is not satisfied, then the flowchart also concludes at block 525, and the user input gesture is processed as intended (that is, the gesture input is not suppressed).

Returning to block 530, if a determination is made that the cancellation threshold is satisfied, the flowchart continues to block 535. At block 535, the graphical indication is presented indicating the gesture release. The graphical indication of the gesture release may indicate that the user input action for which user input was initiated will no longer complete. That is, the action associated with the user input component has been canceled. It should be noted that the graphical indication of the input release may be provided as part of the complete processing of the user in the gesture as described at block 525, according to some embodiments. The flowchart concludes at block 540, and the user input action for the input gesture is disregarded.

Figure 6:
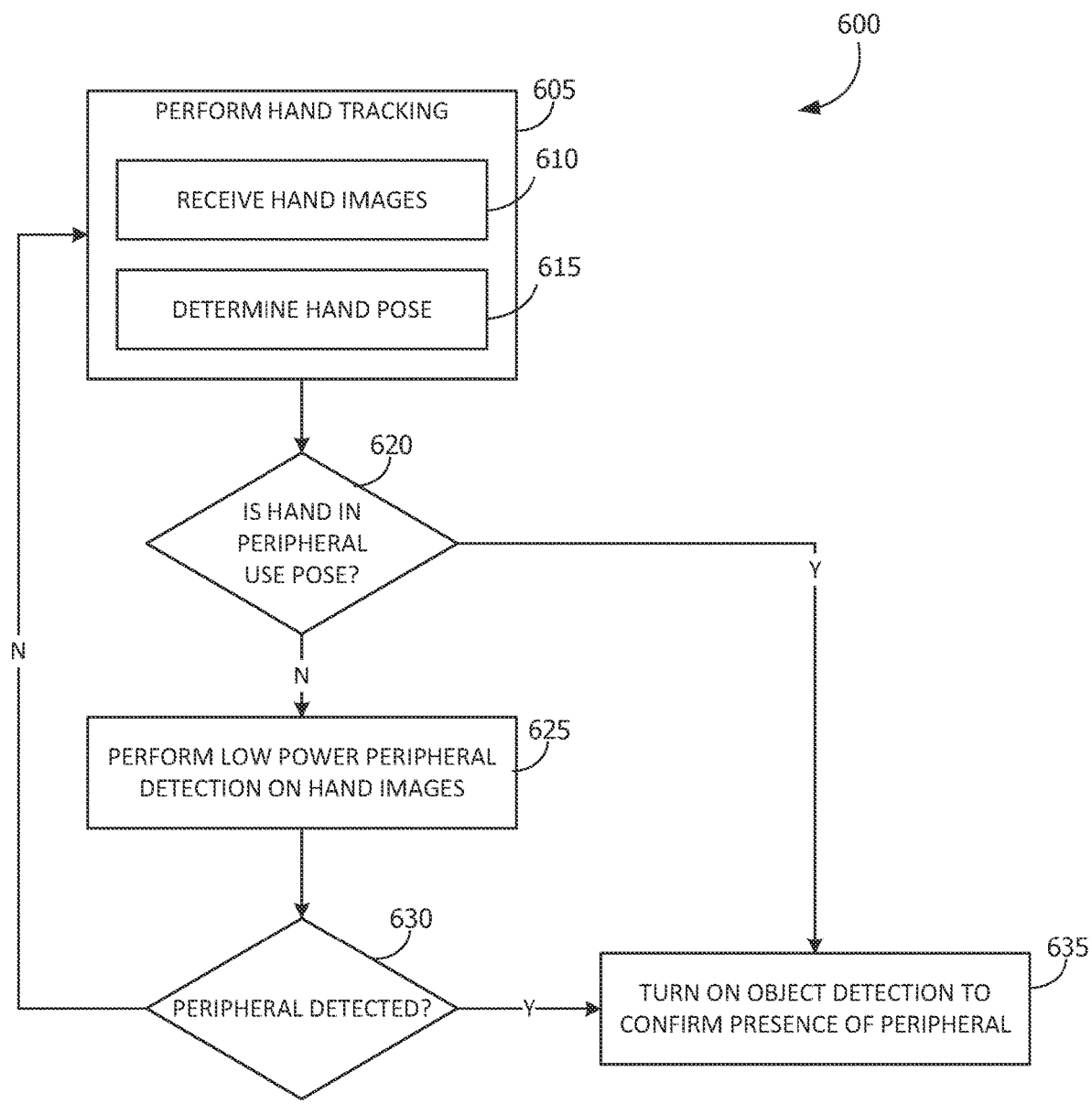
FIG. 6 shows a flowchart of a technique for activating computer vision systems, in accordance with one or more embodiments.

In some embodiments, it may be useful to confirm that a peripheral device is in the vicinity of the user's hand when determining whether the hand is in a peripheral use mode. In some embodiments, the presence of the peripheral device may be used to confirm, or add confidence to a determination that a hand is in a peripheral use mode. FIG. 6 shows a flowchart of a technique for activating computer vision systems, in accordance with one or more embodiments. Although the various processes depict the steps performed in a particular order and may be described as being performed by particular components, it should be understood that the various actions may be performed by alternate components. In addition, the various actions may be performed in a different order. Further, some actions may be performed simultaneously, and some may not be required, or others may be added.

The flowchart 600 begins at block 605, where hand tracking is performed. Hand tracking data may be performed to determine a state of a hand in the scene, a location of the hand, and the like. In performing hand tracking, hand tracking data may be generated. The hand tracking data may include, for example, image data of one or more hands, depth data of one or more hands, movement data of one or more hands, or the like. In some embodiments, this image data may include a cropped image of the hand in the environment from which characteristics of the hand may be determined. Hand tracking data may indicate, for example, whether a user's hand pose, movement, and/or location is indicative of a user using a peripheral device or gesture input. As such, performing hand tracking at block 605 includes receiving hand images, as shown at block 610, and determining a hand pose, as shown at block 615.

The flowchart 600 continues to block 620, where a determination is made as to whether the hand is in a peripheral use pose. In some embodiments, the determination may be made using heuristics, a trained network, or the like. For example, in some embodiments, hand tracking information may be passed to a network trained to predict whether a hand is in a pose consistent with the use of a peripheral device. Additionally, or alternatively, other signals may be used for the determination, such as gaze detection, UI characteristics, or the like. If a determination is made at block 620 that the hand is in a peripheral use pose, then the flowchart concludes at block 635. At block 635, object detection is activated to confirm the presence of a peripheral device and, optionally, to identify the peripheral, such as determining a peripheral identifier, a peripheral classification, or the like. Activating object detection may include activating computer vision systems on a device or the like. Accordingly, the initial detection of the potential peripheral may be performed in a low-power mode, whereas at block 635, a high-power computer vision mode, is activated to confirm the presence or location of a peripheral device in the scene.

Returning to block 620, if a determination is made that the hand is not in a peripheral use mode, then the flowchart continues to block 625, and low-power peripheral detection is performed on the hand images. For example, the system may include a low-power trained network for utilizing hand crops from the hand tracking pipeline to predict whether a peripheral device is present in the hand crops. At block 630, a determination is made whether a peripheral was detected in the low-power mode. If the peripheral is not detected, then the flowchart returns to block 605, and hand tracking is continuously performed by the system. In contrast, returning to block 630, if a peripheral device is detected in a low-power mode, then the flowchart concludes at block 635, where a high-power computer vision mode is activated to confirm the presence or location of a peripheral device in the scene.

In some embodiments, the classification at block 620 that the hand is in a peripheral use pose can also be used to improve the effectiveness of a palm-down heuristic without requiring a higher power algorithm. Low-power hand tracking may have some limitations, such as one-handed typing, or when a user has their hands in their lap. By determining whether a peripheral device is present, the decision can be used to improve the hand pose determination in future cases.

According to some embodiments, some gestures may be allowed during the peripheral use mode. For example, a scroll gesture may be allowed during a peripheral use mode to allow a user to quickly navigate an interface in which the user is typing. However, because a scroll is not detected in a single frame, a contact event that initiates a scroll gesture may initially be rejected. Thus, when the pinch moves in a manner that makes the scroll detectable, the gesture may need to be recovered from the prior frames.

Figure 7:
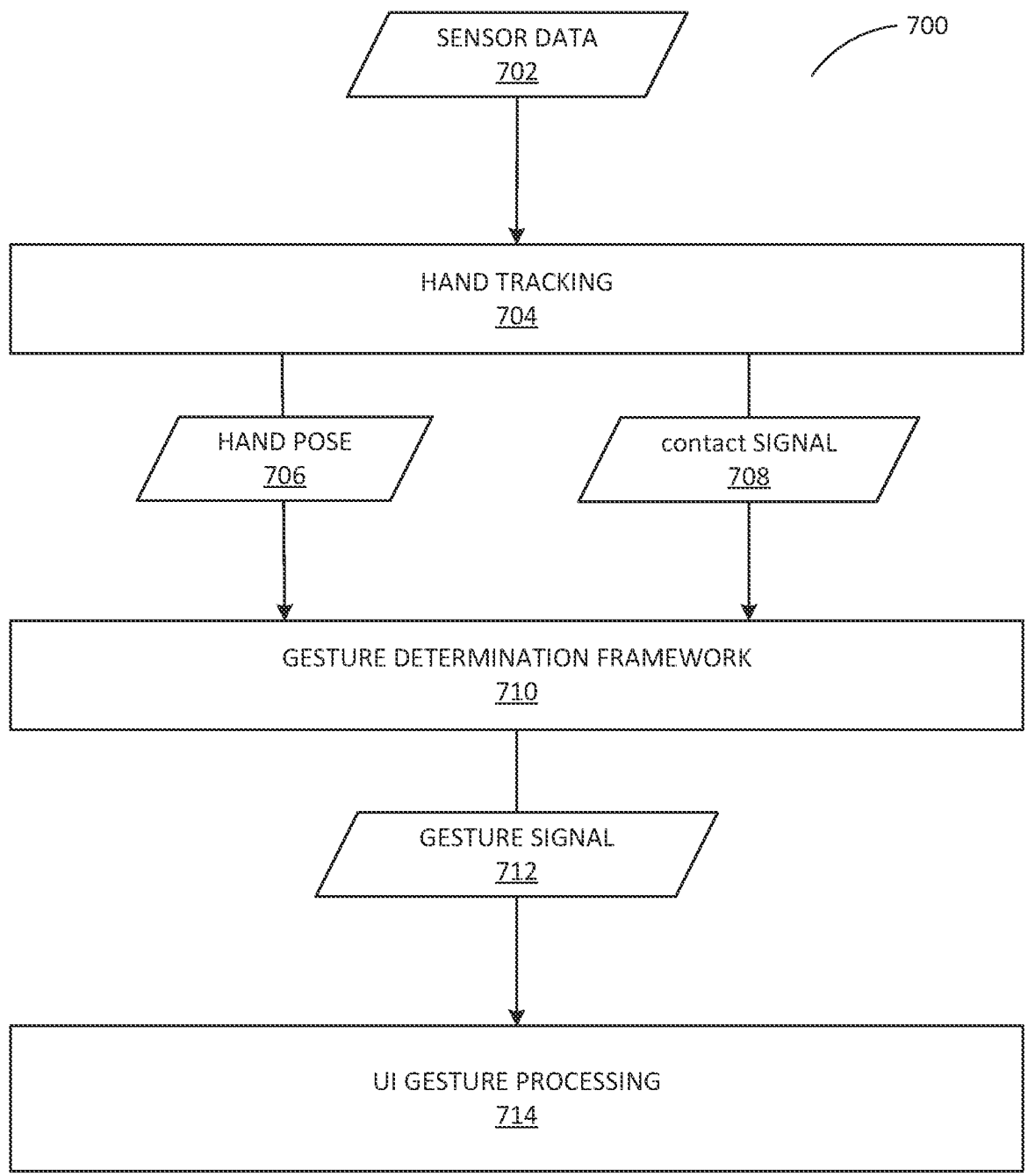
FIG. 7 shows a flow diagram of a technique for detecting input gestures, in accordance with some embodiments.

FIG. 7 shows a flow diagram of a technique for detecting input gestures, in accordance with some embodiments. In particular, FIG. 7 shows a gesture estimation pipeline 700 in which a user input gesture is recognized and processed. Although the flow diagram shows various components which are described as performing particular processes, it should be understood that the flow of the diagram may be different in accordance with some embodiments, and the functionality of the components may be different in accordance with some embodiments.

The flow diagram 700 begins with sensor data 702. In some embodiments, the sensors data may include image data and/or depth data captured of a user's hand or hands. In some embodiments, the sensor data may be captured from sensors on an electronic device, such as outward facing cameras on a head mounted device, or cameras otherwise configured in an electronic device to capture sensor data including a user's hands. According to one or more embodiments, the sensor data may be captured by one or more cameras, which may include one or more sets of stereoscopic cameras. In some embodiments, the sensor data 702 may include additional data collected by an electronic device and related to the user. For example, the sensor data may provide location data for the electronic device, such as position and orientation of the device.

In some embodiments, the sensor data 702 may be applied to a hand tracking network 704. The hand tracking network may be a network trained to estimate a physical state of a user's hand or hands. In some embodiments, the hand tracking network 704 predicts a hand pose 706. The hand pose may be a classified pose of a hand based on the estimated physical state, or may provide some other form of data indicative of a pose of a hand. For example, in some embodiments, the hand pose data 706 may include an estimation of joint location for a hand. Further, in some embodiments, the hand tracking network 704 may be trained to provide an estimation of an estimate of a device location, such as a headset, and/or simulation world space.

In some embodiments, the hand tracking network 704 may further be configured to provide contact data, for example in the form of contact signal 708. The contact data may include a prediction as to whether, for a given frame or frames, a contact is occurring between two regions on the hand. For example, a machine learning model may be trained to predict whether a thumb pad and index finger are in contact. For purposes of the description herein, a contact refers to contact between two surfaces regardless of intent, whereas a pinch is defined as a contact being performed with the intent of producing a corresponding input action. As will be described in greater detail below, in some embodiments, the hand tracking may predict whether a contact occurs based on the sensor data 702 and/or hand pose data 706.

According to one or more embodiments, gesture determination framework 710 provides a determination as to whether a particular pose presented in the sensor data 702 is intentional. That is, a determination is made as to whether a classified pose of the hand (for example, based on or provided by the hand pose data 706) is intentional. When the determined hand pose includes a contact event, such as a pinch, then the gesture determination framework 710, may use the contact signal 708 provided by the hand tracking network 704 in determining whether an intentional gesture is performed.

In some embodiments, the gesture determination framework 710 may utilize additional data not explicitly depicted in FIG. 7. For example, the gesture determination framework 710 may receive signals such as user interface (UI) geometry, gaze estimation, events generated by connected peripherals, user interaction with objects, and the like. As will be described in FIG. 9, the gesture determination framework 710 may consider the various features from the inputs to make a determination for a particular input gesture, whether the gesture is intentional. This determination may be transmitted in the form of a gesture signal 712 to a UI gesture processing module 714. The gesture signal may indicate whether or not an intentional input gesture has occurred. In some embodiments, the gesture signal 712 may also be used to indicate whether a previous gesture signal should be cancelled. This may occur, for example, if a user shifts their position, sets their hands down, or the like.

According to one or more embodiments, the hand pose data 706 and/or contact signal 708 may be determined based on a set of heuristics, as will be described in greater detail below. These heuristics may be used to determine whether a hand pose 706 and/or contact signal 708 is associated with a user input gesture. The determination may be made, for example, at each frame. As such, an initial frame that depicts a pinch may cause the system to identify a pinch. However, if the pinch is the beginning of a scroll (for example, defined as a pinch that is moved through space over a predefined distance), then the scroll is not initially identified, as the movement is not detectable by the first frame.

In some embodiments, a subset of gestures may be accepted or rejected in a peripheral use mode. For example, a pinch may be rejected, while a scroll may not be rejected. As such, in the event that an initial event is detected for a first frame, the corresponding gesture will be rejected until a determination can be made that the scroll gesture is detected.

The UI gesture processing module 714 may be configured to enable a user input action based on the gesture signal 712. A particular gesture, such as a pinch, may be associated with a selection action of a UI component or the like. In some embodiments, if a cancellation signal is received corresponding to a gesture signal 712, which has already been initiated, the system can process that gesture differently than if it were not cancelled. For example, a UI component can be shown as selected but not activated, etc. As another example, a previously initiated stroke drawn by the user can be truncated or undone.

In addition, a gesture that was originally disregarded, such as a pinch during a peripheral mode, may later be detected to be part of a valid gesture, such as a scroll during the peripheral mode. In this scenario, a frame at which the gesture began (for example, the pinch at the beginning of the scroll,) may be recalled in order to process the associated gesture-based input action. As such, a point of origin of the scroll gesture may be based on the original pinch, which may have initially been discarded as being a gesture to be rejected during a peripheral use mode.

Figure 8:
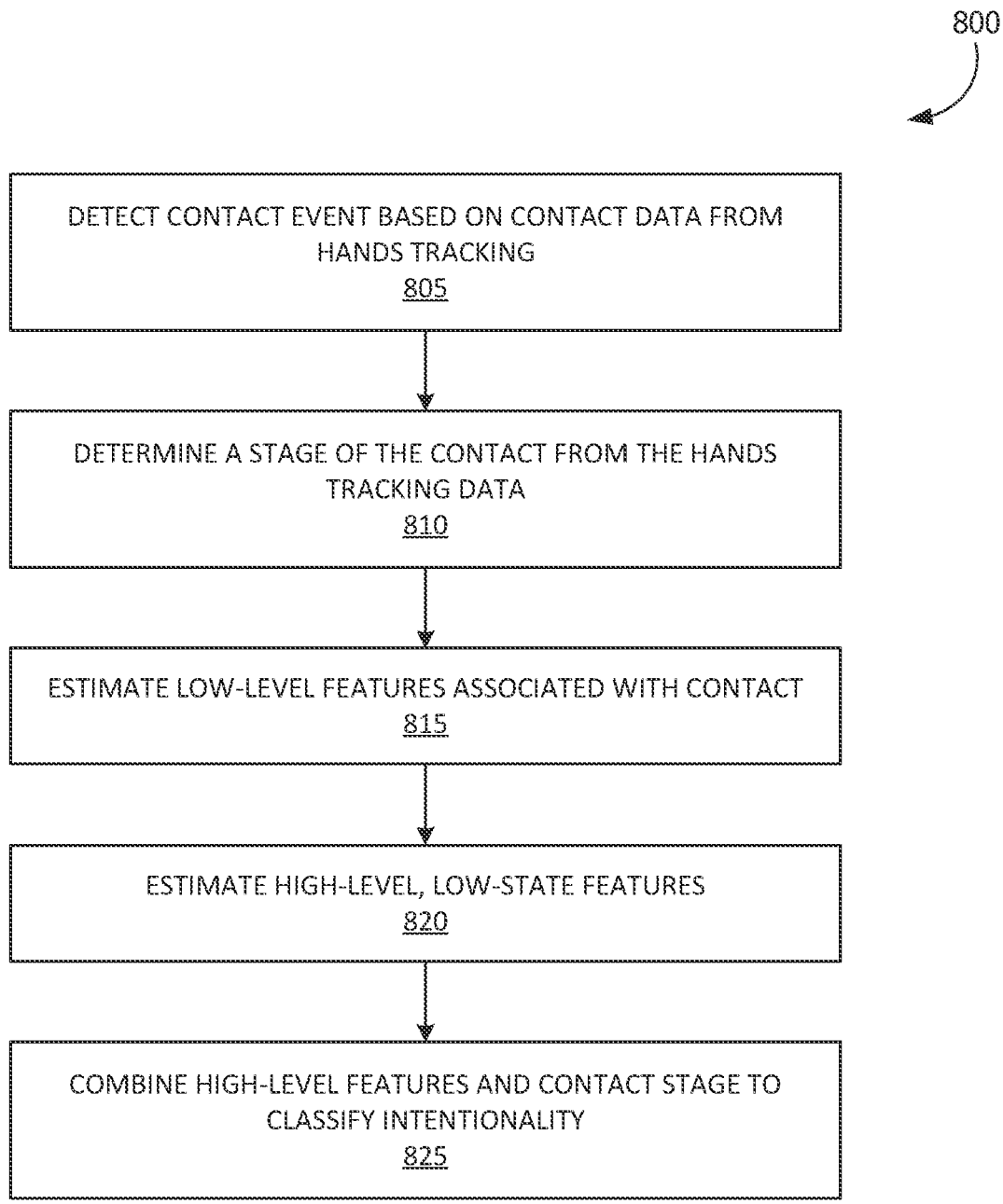
FIG. 8 shows a flowchart of a technique for determining intentionality of a gesture, in accordance with some embodiments.

As described above, the gesture determination framework 710 may be configured to generate a classification of intentionality for a gesture. The gesture determination framework 710 may be configured to estimate a pose or gesture of a hand, and determine whether the gesture was intended to be used for triggering a user input action. FIG. 8 shows a flowchart of a technique for classifying intentionality of a gesture, in accordance with some embodiments. For purposes of explanation, the following steps will be described as being performed by particular components of FIG. 7. However, it should be understood that the various actions may be performed by alternate components. The various actions may be performed in a different order. Further, some actions may be performed simultaneously, some may not be required, or others may be added.

The flowchart 800 begins at block 805, where a contact event is detected based on contact data from the hand tracking network. The contact may be detected, for example, based on a contact signal 708 received from the hand tracking network 704. According to some embodiments, some gestures may require contact, such as a pinch or the like. Further, multiple types of pinches may be recognized with different kinds of contact. According to some embodiments, not every gesture may require a contact event. As such, the contact may not be detected, or the contact signal 708 may indicate that the contact occurs. In some embodiments, the contact signal 708 may not be received, or may otherwise be ignored and a gesture may still be recognized.

The flowchart 800 continues to block 810, where a contact stage is determined from hand tracking data. The contact stage may indicate, for a given frame, what phase of the contact action the fingers are currently in. According to some embodiments, the features of interest in determining intentionality may vary depending upon a current state of a gesture. For gestures that include a contact event, the stage in which the gesture is currently in may affect the ability to enable, cancel, or reject an associated input action. Some examples of contact stage include an idle state, an entry state, in which a contact event is beginning, such as a pinch down phase, a hold state, where a pinch is currently occurring, and an exit stage, for example, when a pinch up occurs for the pinch is ending.

At block 815, low-level features are estimated in association with the contact. The low-level features may be determined from the hand tracking data and/or additional data may include estimations of what a hand is doing during the frame. For example, other sources of data include pose information for a device capturing the hand tracking data, hand pose, UI geometry, etc. In some embodiments, the low-level features are determined without regard for intent. Examples of low-level features include, for example, a pinch speed on pinch down, a measure of wrist flex, finger curl, proximity of hand to head, velocity of hand, and the like.

The flowchart 800 continues to block 820, where high-level, low-state features are estimated. The high-level, low-state features may include modal features that estimate what a user is doing during the contact in order to determine intentionality. In some embodiments, the high-level features may be features which are interoperable, and which can be individually validated. Examples include, estimates as to whether hands are using one or more peripheral devices, a frequency of a repetition of a gesture (for example, if a user is pinching quickly), if hand is holding an object, or if a hand is in a resting position, a particular pinch or gesture style (i.e., a pinch using pads of two fingers, or using the side of a finger). In some embodiments, the high-level features may be based on user activity, such as a user fidgeting, talking, or reading. According to one or more embodiments, the high-level features may be determined based on the hand tracking data, the determined contact stage, and/or the estimated basic features. In some embodiments, the high-level features may directly determine intentionality of an action. As an example, if a user is using a peripheral device such as a keyboard, a pinch may be rejected, or the gesture may be determined to be unintentional.

According to one or more embodiments, the high-level features may indicate that the user is likely in a peripheral use mode, either based on user pose, user input, or other signals. For example, a location of a wrist joint and one or more fingers may be tracked. If the motion of the fingers relative to the wrist joint satisfies predefined parameters, the hand may be determined to be in a peripheral use mode. In some embodiments, the high-level features may be determined based on other signals or parameters, such as detected user input by a peripheral device, or the like.

The flowchart concludes at block 825, where the gesture determination framework 710 combines high-level features and the contact stage to classify intentionality. In some embodiments, the gesture determination framework 710, uses a conditional combination of high-level features and contact stage to classify intentionality. The classification can then be used to signal the gesture to be processed as an input gesture (thereby activating an associated UI input action), cancel the associated action if the gesture is determined to be unintentional (for example, if a UI action associated with the gesture has already been initiated), or disregard the gesture.

Figure 9:
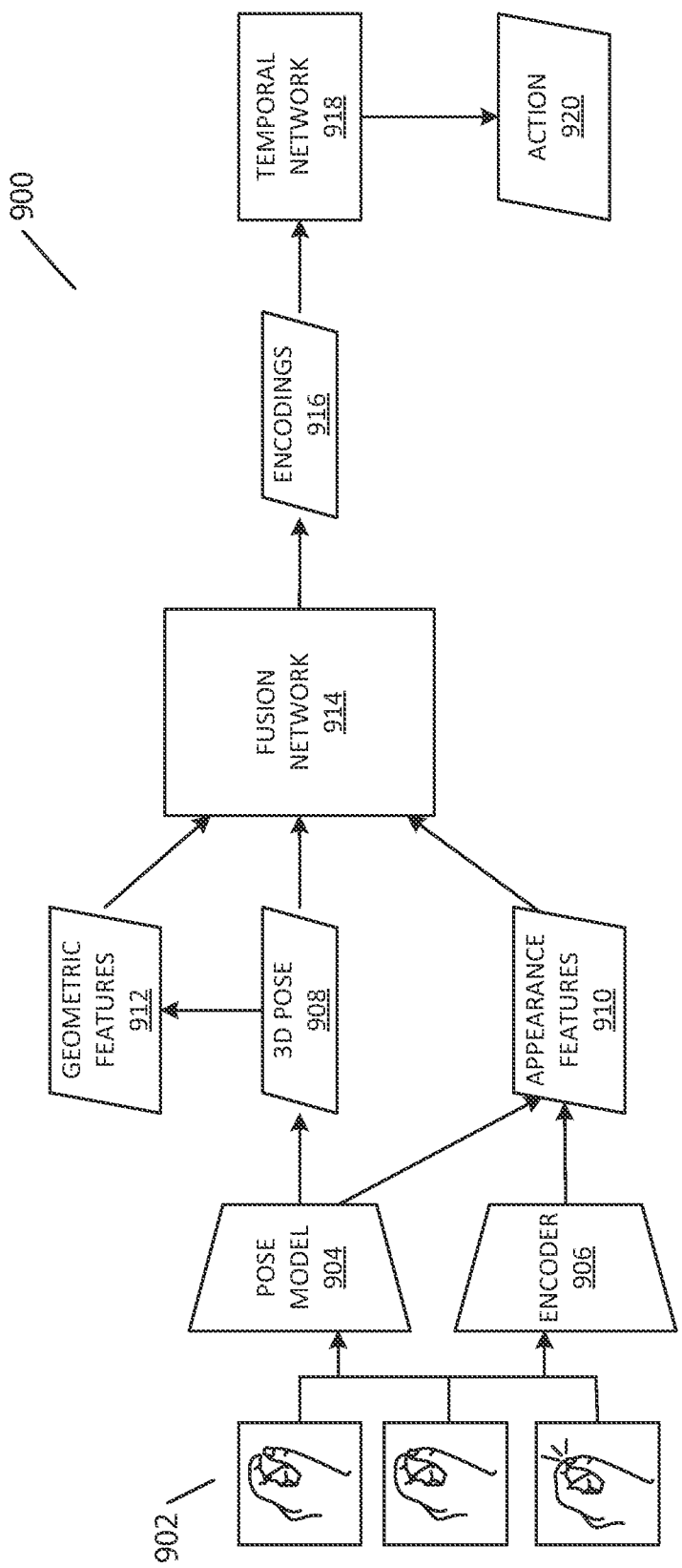
FIG. 9 shows a flow diagram of an action network, in accordance with some embodiments.

The contact signal 708 of FIG. 7, can be determined in a number of ways. For example, in some embodiments, heuristics can be used based on the hand tracking data to determine whether a contact has occurred, and/or a current contact stage. FIG. 9 shows a flow diagram of an action network, in accordance with some embodiments, which provides an example machine learning process for determining whether a contact event has occurred.

The pipeline 900 begins with a set of frames 902 as input. The frames 902 may be a temporal series of image frames of a hand captured by one or more cameras. The cameras may be individual cameras, stereo cameras, cameras for which the camera exposures have been synchronized, or a combination thereof. The cameras may be situated on a user's electronic device, such as a mobile device or a head mounted device. The frames may include a series of one or more frames associated with a predetermined time. For example, the frames 902 may include a series of individual frames captured at consecutive times, or may include multiple frames captured at each of the consecutive times. The entirety of the frames may represent a motion sequence of a hand from which a contact event may or may not be detected for any particular time.

The frames 902 may be applied to a pose model 904. The pose model 904 may be a trained neural network configured to predict a 3D pose 908 of a hand based on a given frame (or set of frames, for example, in the case of a stereoscopic camera) for a given time. That is, each frame of frame set 902 may be applied to pose model 904 to generate a 3D pose 908. As such, the pose model 904 can predict the pose of a hand at a particular point in time. In some embodiments, geometric features 912 may be derived from the 3D pose 908. The geometric features may indicate relational features among the joints of the hand, which may be identified by the 3D pose. That is, in some embodiments, the 3D pose 908 may indicate a position and location of joints in the hand, whereas the geometric features 912 may indicate the spatial relationship between the joints. As an example, the geometric features 912 may indicate a distance between two joints, etc.

In some embodiments, the frames 902 may additionally be applied to an encoder 906, which is trained to generate latent values for a given input frame (or frames) from a particular time indicative of an appearance of the hand. The appearance features 910 may be features which can be identifiable from the frames 902, but not particularly useful for pose. As such, these appearance features may be overlooked by the pose model 904, but may be useful within the pipeline 900 to determine whether a contact event occurs. For example, the appearance features 910 may be complementary features to the geometric features 912 or 3D pose 908 to further the goal of determining a particular action 920, such as whether a contact event has occurred. According to some embodiments, the encoder 906 may be part of a network that is related to the pose model 904, such that the encoder 906 may use some of the pose data for predicting appearance features 910. Further, in some embodiments, the 3D pose 908 and the appearance features 910 may be predicted by a single model, or two separate, unrelated models. The result of the encoder 906 may be a set of appearance features 910, for example, in the form of a set of latents.

A fusion network 914 is configured to receive as input, the geometric features 912, 3D pose 908, and appearance features 910, and to generate, per time, a set of encodings 916. The fusion network 914 may combine the geometric features 912, 3D pose 908, and appearance features 910 in any number of ways. For example, the various features can be weighted in the combination in different ways or otherwise combined in different ways to obtain a set of encodings 916, per time.

The encodings 916 are then run through a temporal network 918 to determine an action 920, per time. The action 920 may indicate, for example, whether a contact event, or change in contact stage has occurred or not. The temporal network 918 may consider both a frame (or set of frames) for a particular time for which the action 920 is determined, as well as other frames in the frame set 902.

Figure 10:
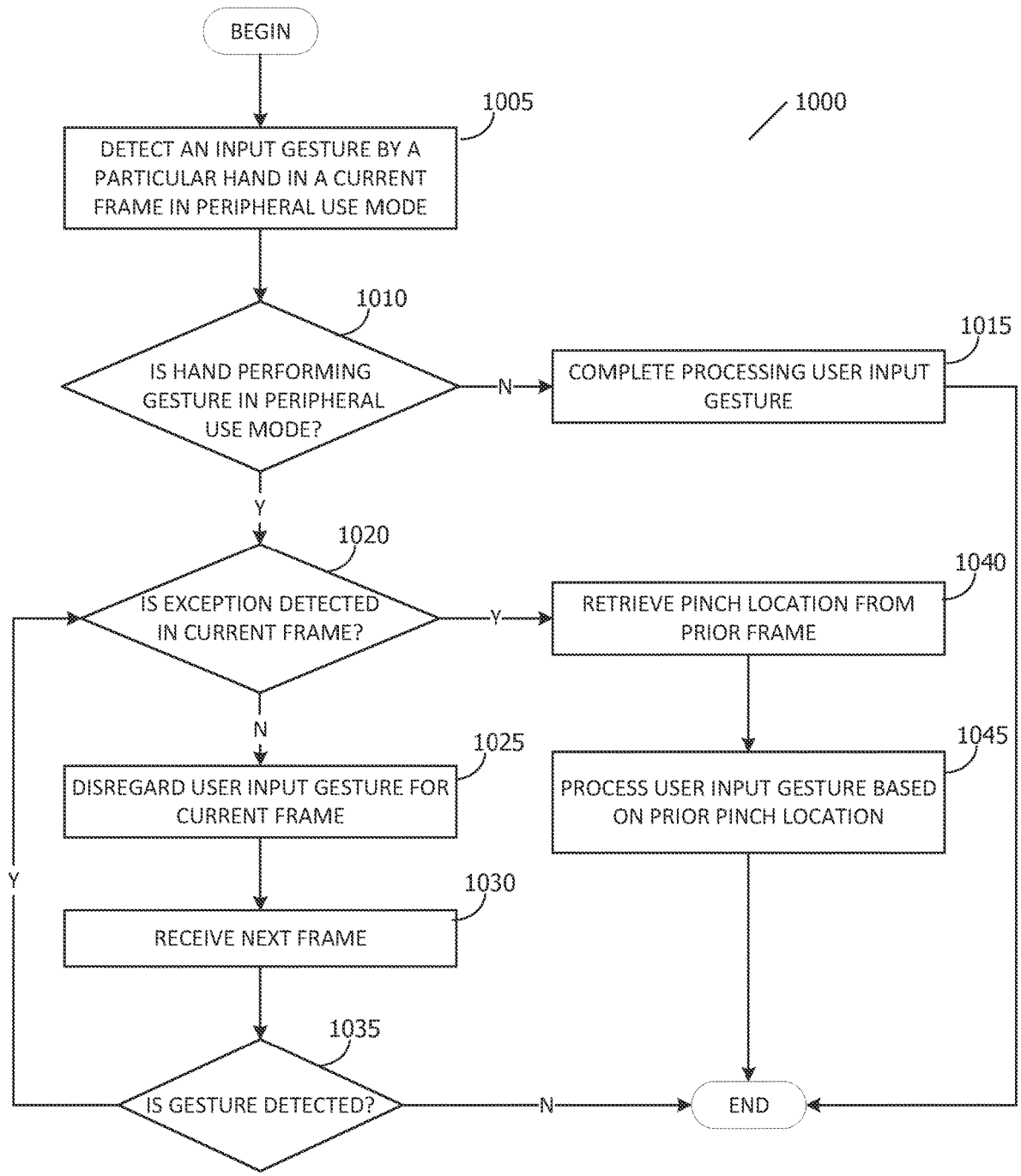
FIG. 10 shows a flowchart of a technique for accepting gesture input during a peripheral mode, according to some embodiments.

FIG. 10 depicts a flowchart of a technique for recovering contact data during a peripheral use mode. Although the various processes depict the steps performed in a particular order and may be described as being performed by particular components, it should be understood that the various actions may be performed by alternate components. In addition, the various actions may be performed in a different order. Further, some actions may be performed simultaneously, some may not be required, or others may be added.

The flowchart 1000 begins at block 1005, where an input gesture is detected by a particular hand for a particular frame. In some embodiments, the gesture determination may be made based on each frame of a temporal set of frames of hand tracking data. The input gesture may be detected, for example, from a hand tracking pipeline 704. That is, the hand tracking pipeline 704 may provide hands data from which a determination may be made as to whether the hand is performing a predetermined gesture associated with user input, such as the gesture signal 712. The input gesture may be detected from either hand, according to some embodiments.

The flowchart 1000 continues at block 1010, where a determination is made as to whether the hand performing the gesture is in a peripheral use mode. Whether the hand is in a peripheral use mode may be determined in a variety of ways as described above with respect to FIG. 2. If the hand is not in a peripheral use mode, then the flowchart concludes at block 1015, and the user input gesture is processed as user input. This may include, for example, triggering an input event, such as a user input action associated with the gesture. In some embodiments, the input event may include visual feedback indicative of the recognition of the gesture. As an example, a user interface component may be enlarged, highlighted, or otherwise visually modified to indicate recognition of the input gesture.

Returning to block 1010, if a determination is made that the hand performing the gesture is in a peripheral use mode, then the flowchart 1000 proceeds to block 1020. At block 1020, a determination is made as to whether An exception is detected in the current frame. Exceptions may include any gesture which is allowed to be used for user input during a peripheral use mode, such as a scroll. In some embodiments, a scroll is a gesture which is defined by a detected pinch which travels at least a predefined distance.

In some embodiments, the particular distance used to identify the pinch may be different based on a direction of the movement of the pinched and motion of the hand. For example, a horizonal motion may be associated with a different threshold distance than a vertical motion. Alternatively, the threshold distance for the horizontal movement may be greater than the threshold distance for a vertical movement. For example, a horizontal movement over a keyboard may be more natural than a vertical motion moving away from the keyboard. Thus, the threshold distance for the vertical threshold may be smaller than the horizontal threshold to align with a user's natural movements. With respect to scrolls, because the scroll is detected based on movement, a scroll may not be detected by a single frame. Rather, a determination must be made over several frames so that the motion associated with the scroll can be detected. However, because the scroll begins with a pinch, a pinch may initially be detected from a first one or more frames.

If a determination is made at block 1020 that the scroll is not detected in the current frame, then the flowchart proceeds to block 1025, and the user input gesture is disregarded for the current frame. That is, the user input gesture detected at block 1005 can be suppressed such that the gesture does not trigger a user input action. The flowchart then proceeds to block 1030 and a next frame of hand tracking data is received. Then, at block 1035, a determination is made as to whether the gesture is still detected. That is, a determination is made as to whether the user is continuing to perform a gesture which can be associated with user input. If not, then the flowchart concludes.

Returning to block 1035, if the gesture is still detected in the current frame, then the flowchart returns to block 1020. Here, at block 1020, a determination is made as to whether a scroll is detected based on the current frame. That is, based on the series of frames in which the gesture is detected, a determination is made as to whether a scroll motion is present. If, based on the current frame, a scroll is detected, then the flowchart proceeds to block 1040 and a pinch location is retrieved from a prior frame. That is, the scroll is processed by reviving gesture data from prior frames which was previously disregarded by suppressing the previously determined gestures for those frames. The flowchart 1000 then concludes at block 1045, where the user input gesture (i.e., the scroll) is processed using the retrieved gesture data from the prior frames.

Figure 11:
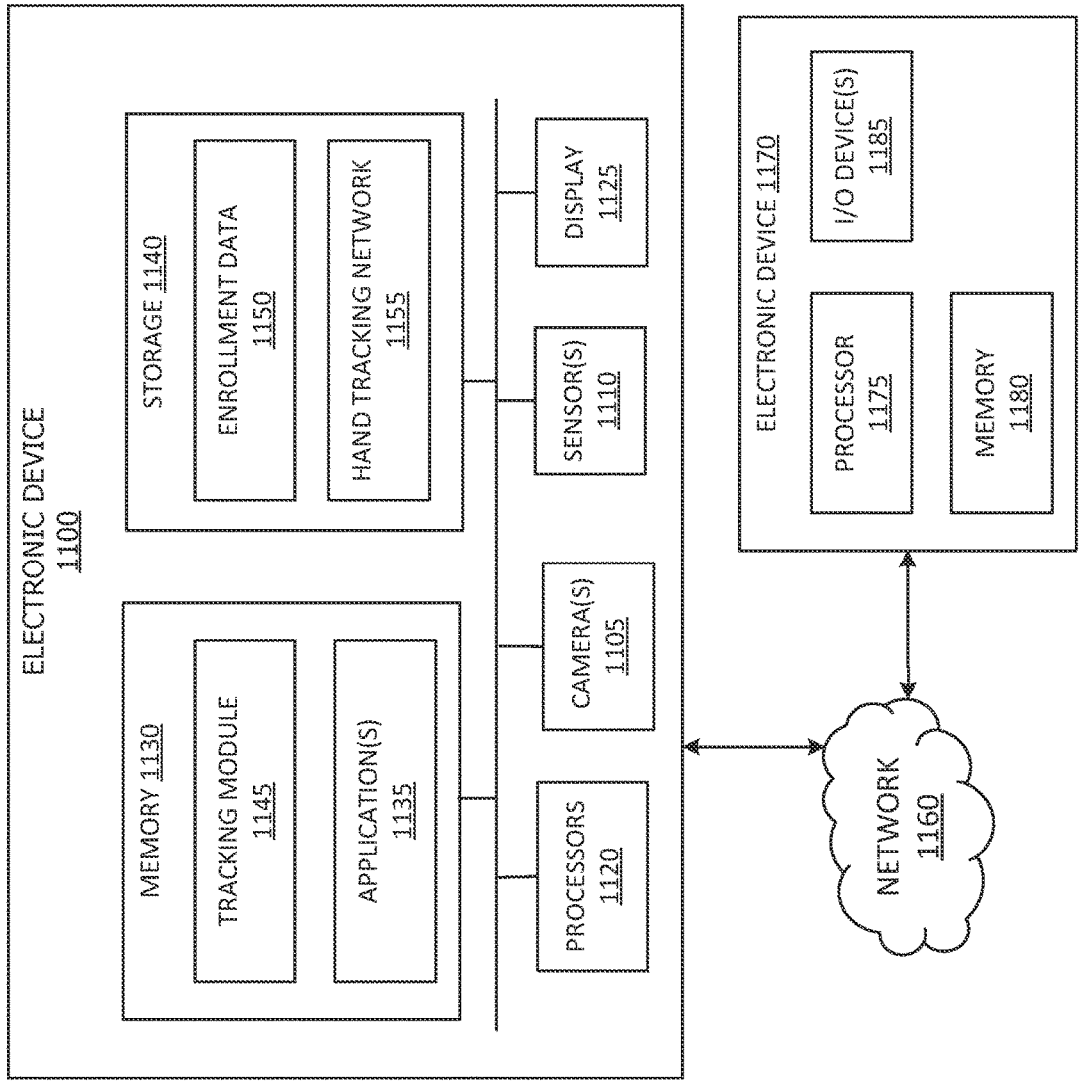
FIG. 11 shows, in block diagram form, exemplary systems for managing UI engagement, according to some embodiments.

FIG. 11 depicts a network diagram for a system by which various embodiments of the disclosure may be practiced. Specifically, FIG. 11 depicts an electronic device 1100 that is a computer system. Electronic device 1100 may be part of a multifunctional device, such as a mobile phone, tablet computer, personal digital assistant, portable music/video player, wearable device, head-mounted systems, projection-based systems, base station, laptop computer, desktop computer, network device, or any other electronic systems such as those described herein. Electronic device 1100 may be connected to other devices across a network 1160, such as an additional electronic device 1170, mobile devices, tablet devices, desktop devices, and remote sensing devices, as well as network storage devices, and the like. Illustrative networks include, but are not limited to, a local network such as a universal serial bus (USB) network, an organization's local area network, and a wide area network, such as the Internet.

Electronic device 1100 and/or additional electronic device 1170 may additionally, or alternatively, include one or more additional devices within which the various functionality may be contained, or across which the various functionality may be distributed, such as server devices, base stations, accessory devices, and the like. It should be understood that the various components and functionality within electronic device 1100 and additional electronic device 1110 may be differently distributed across the devices, or may be distributed across additional devices.

Electronic device 1100 may include a processor 1120. Processor 1120 may be a system-on-chip, such as those found in mobile devices, and include one or more central processing units (CPUs), dedicated graphics processing units (GPUs), or both. Further, processor 1120 may include multiple processors of the same or different type. Electronic device 1100 may also include a memory 1130. Memory 1130 may include one or more different types of memory, which may be used for performing device functions in conjunction with processor 1120. For example, memory 1130 may include cache, ROM, RAM, or any kind of transitory or non-transitory computer readable storage medium, capable of storing computer readable code. Memory 1130 may store various programming modules during execution, such as tracking module 1145, which can perform hand tracking techniques, gaze tracking techniques, and the like. In some embodiments, the tracking module 1145 may use eye tracking sensors, cameras 1105, or other sensor(s) 1110, to determine a portion of a scene at which a user's eyes are directed. Further, memory 1130 may include one or more additional applications 1135.

Electronic device 1100 may also include storage 1140. Storage 1140 may include one more non-transitory computer-readable mediums including, for example, magnetic disks (fixed, floppy, and removable) and tape, optical media such as CD-ROMs and digital video disks (DVDs), and semiconductor memory devices, such as Electrically Programmable Read-Only Memory (EPROM), and Electrically Erasable Programmable Read-Only Memory (EEPROM). Storage 1140 may be utilized to store various data and structures which may be utilized for suppressing hand gestures upon detection of hit events. For example, storage 1140 may include enrollment data 1150, which may be used to track a user, such as by hand tracking techniques or eye tracking techniques. Enrollment data 1150 may also include user preferences which may be used to determine whether a hand is in a peripheral use mode, for example. Storage 1140 may also include a hand tracking network 1155, which may be a trained network by which hand tracking is performed, as described above.

Electronic device 1100 may include a set of sensors 1110. In this example, the set of sensors 1110 may include one or more image capture sensors, an ambient light sensor, a motion sensor, an eye tracking sensor, and the like. In other implementations, the set of sensors 1110 further includes an accelerometer, a global positioning system (GPS), a pressure sensor, and the inertial measurement unit (IMU), and the like.

Electronic device 1100 may allow a user to interact with XR environments. Many electronic systems enable an individual to interact with and/or sense various XR settings. One example includes head mounted systems. A head mounted system may have an opaque display and speaker(s). Alternatively, a head mounted system may be designed to receive an external display (e.g., a smartphone). The head mounted system may have imaging sensor(s) and/or microphones for taking images/video and/or capturing audio of the physical setting, respectively. A head mounted system also may have a transparent or semi-transparent display 1125. The transparent or semi-transparent display 1125 may incorporate a substrate through which light representative of images is directed to an individual's eyes. The display 1125 may incorporate LEDs, OLEDs, a digital light projector, a laser scanning light source, liquid crystal on silicon, or any combination of these technologies. The substrate through which the light is transmitted may be a light waveguide, optical combiner, optical reflector, holographic substrate, or any combination of these substrates. In one embodiment, the transparent or semi-transparent display 1125, may transition selectively between an opaque state and a transparent or semi-transparent state. In another example, the electronic system may be a projection-based system. A projection-based system may use retinal projection to project images onto an individual's retina. Alternatively, a projection system also may project virtual objects into a physical setting (e.g., onto a physical surface or as a holograph). Other examples of XR systems include heads up displays, automotive windshields with the ability to display graphics, windows with the ability to display graphics, lenses with the ability to display graphics, headphones or earphones, speaker arrangements, input mechanisms (e.g., controllers having or not having haptic feedback), tablets, smartphones, and desktop or laptop computers.

In some embodiments, the electronic device 1100 may be communicably connected to additional electronic device 1170 across network 1160. The additional electronic device 1170 may include a processor 1175, and memory 1180, and I/O devices 1185. In some embodiments, I/O devices may be used to allow a user to interface with an application stored on memory 1180 and being executed by processor 1175. As described above, the tracking module 1145 in the electronic device 1100 may determine whether a user's hand is in a peripheral use mode, for example, if the user's hand is interacting with one of I/O devices 1185, or if the interaction with I/O devices 1185 is predicted. In some embodiments, hit events may be determined from the I/O devices 1185, for example, based on the tracking module 1145. In some embodiments, the electronic device 1170 may communicate an indication of the hit event to electronic device 1100. As another example, in some embodiments, electronic device 1100 may be communicatively coupled directly to I/O devices 1185. For example, the I/O devices 1185 may be communicatively coupled directly to electronic device 1100, for example, over a Bluetooth connection or other short-range connection.

Figure 12:
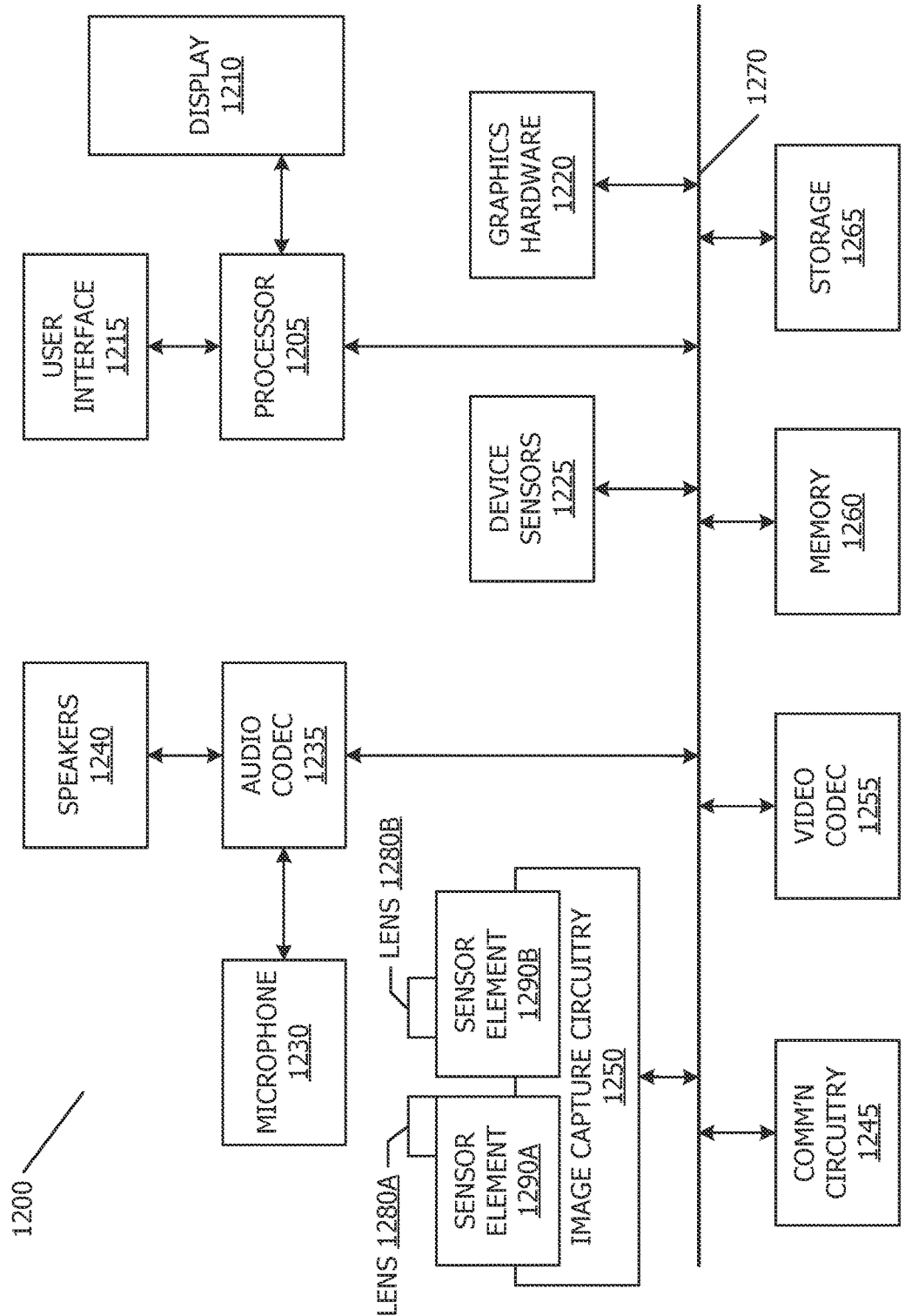
FIG. 12 shows an exemplary system for use in motion mapping, in accordance with one or more embodiments.

Referring now to FIG. 12, a simplified functional block diagram of illustrative multifunction electronic device 1200 is shown according to one embodiment. Each of electronic devices may be a multifunctional electronic device, or may have some or all of the described components of a multifunctional electronic device described herein. Multifunction electronic device 1200 may include processor 1205, display 1210, user interface 1215, graphics hardware 1220, device sensors 1225 (e.g., proximity sensor/ambient light sensor, accelerometer and/or gyroscope), microphone 1230, audio codec(s) 1235, speaker(s) 1240, communications circuitry 1245, digital image capture circuitry 1250 (e.g., including camera system), video codec(s) 1255 (e.g., in support of digital image capture unit), memory 1260, storage device 1265, and communications bus 1270. Multifunction electronic device 1200 may be, for example, a digital camera or a personal electronic device such as a personal digital assistant (PDA), personal music player, mobile telephone, or a tablet computer.

Processor 1205 may execute instructions necessary to carry out or control the operation of many functions performed by device 1200 (e.g., such as the generation and/or processing of images as disclosed herein). Processor 1205 may, for instance, drive display 1210 and receive user input from user interface 1215. User interface 1215 may allow a user to interact with device 1200. For example, user interface 1215 can take a variety of forms, such as a button, keypad, dial, a click wheel, keyboard, display screen, touch screen, gaze, and/or gestures. Processor 1205 may also, for example, be a system-on-chip such as those found in mobile devices and include a dedicated GPU. Processor 1205 may be based on reduced instruction-set computer (RISC) or complex instruction-set computer (CISC) architectures, or any other suitable architecture, and may include one or more processing cores. Graphics hardware 1220 may be special purpose computational hardware for processing graphics and/or assisting processor 1205 to process graphics information. In one embodiment, graphics hardware 1220 may include a programmable GPU.

Image capture circuitry 1250 may include two (or more) lens assemblies 1280A and 1280B, where each lens assembly may have a separate focal length. For example, lens assembly 1280A may have a short focal length relative to the focal length of lens assembly 1280B. Each lens assembly may have a separate associated sensor element 1290A or 1290B. Alternatively, two or more lens assemblies may share a common sensor element. Image capture circuitry 1250 may capture still and/or video images. Output from image capture circuitry 1250 may be processed, at least in part, by video codec(s) 1255 and/or processor 1205 and/or graphics hardware 1220, and/or a dedicated image processing unit or pipeline incorporated within circuitry 1265. Images so captured may be stored in memory 1260 and/or storage 1265.

Sensor and camera circuitry 1250 may capture still and video images that may be processed in accordance with this disclosure, at least in part, by video codec(s) 1255 and/or processor 1205 and/or graphics hardware 1220, and/or a dedicated image processing unit incorporated within circuitry 1250. Images so captured may be stored in memory 1260 and/or storage 1265. Memory 1260 may include one or more different types of media used by processor 1205 and graphics hardware 1220 to perform device functions. For example, memory 1260 may include memory cache, read-only memory (ROM), and/or random-access memory (RAM). Storage 1265 may store media (e.g., audio, image and video files), computer program instructions or software, preference information, device profile information, and any other suitable data. Storage 1265 may include one more non-transitory computer-readable storage mediums including, for example, magnetic disks (fixed, floppy, and removable) and tape, optical media such as CD-ROMs and DVDs, and semiconductor memory devices such as EPROM and EEPROM. Memory 1260 and storage 1265 may be used to tangibly retain computer program instructions or code organized into one or more modules and written in any desired computer programming language. When executed by, for example, processor 1205, such computer program code may implement one or more of the methods described herein.

Various processes defined herein consider the option of obtaining and utilizing a user's identifying information. For example, such personal information may be utilized in order to track motion by the user. However, to the extent such personal information is collected, such information should be obtained with the user's informed consent, and the user should have knowledge of and control over the use of their personal information.

Personal information will be utilized by appropriate parties only for legitimate and reasonable purposes. Those parties utilizing such information will adhere to privacy policies and practices that are at least in accordance with appropriate laws and regulations. In addition, such policies are to be well established and in compliance with or above governmental/industry standards. Moreover, these parties will not distribute, sell, or otherwise share such information outside of any reasonable and legitimate purposes.

Moreover, it is the intent of the present disclosure that personal information data should be managed and handled in a way to minimize risks of unintentional or unauthorized access or use. Risk can be minimized by limiting the collection of data and deleting data once it is no longer needed. In addition, and when applicable, including in certain health-related applications, data de-identification can be used to protect a user's privacy. De-identification may be facilitated, when appropriate, by removing specific identifiers (e.g., date of birth), controlling the amount or specificity of data stored (e.g., collecting location data at city level rather than at an address level), controlling how data is stored (e.g., aggregating data across users), and/or other methods.

It is to be understood that the above description is intended to be illustrative and not restrictive. The material has been presented to enable any person skilled in the art to make and use the disclosed subject matter as claimed and is provided in the context of particular embodiments, variations of which will be readily apparent to those skilled in the art (e.g., some of the disclosed embodiments may be used in combination with each other). Accordingly, the specific arrangement of steps or actions shown in FIGS. 2 and 4-10 or the arrangement of elements shown in FIGS. 1, 3, and 7-12 should not be construed as limiting the scope of the disclosed subject matter. The scope of the invention therefore should be determined with reference to the appended claims, along with the full scope of equivalents to which such claims are entitled. In the appended claims, the terms "including" and "in which" are used as the plain-English equivalents of the respective terms "comprising" and "wherein."

The invention claimed is:

1. A method comprising:
obtaining, from image sensor data, hand tracking data for a first hand in accordance with an indication of a peripheral event at a peripheral device;
detecting an input gesture for the first hand based on characteristics of the hand tracking data, wherein the input gesture corresponds to an input action;
determining that characteristics of the hand tracking data for the first hand satisfy a peripheral use criterion based on a palm position of the first hand and a physical characteristic of a scene in which the first hand is located indicating that the hand is positioned proximate to a peripheral device; and
rejecting the input gesture by a user input pipeline in accordance with the determination that the peripheral use criterion is satisfied.

2. The method of claim 1, wherein the peripheral event is associated with the first hand, the method further comprising:
determining that a relationship between the input gesture and the peripheral event satisfy a cancellation threshold,
wherein the input gesture is processed by the user input pipeline to disregard a user input action associated with the input gesture.

3. The method of claim 1, wherein the input gesture is rejected based on a finger pose of the first hand.

4. The method of claim 3, further comprising:
obtaining sensor data capturing the first hand; and
applying the sensor data to a hand classifier trained to predict a peripheral use mode classification based on sensor data comprising the first hand.

5. The method of claim 1, further comprising:
detecting a hand movement of the first hand;
determining whether the hand movement satisfies a cancellation threshold; and
in accordance with a determination that the hand movement satisfies the cancellation threshold, determining that the first hand is in a gesture input mode,
wherein input gestures by the first hand detected during the gesture input mode are processed by the user input pipeline.

6. The method of claim 1, further comprising:
determining a second hand pose for the first hand;
determining, based on the second hand pose, that the first hand is in a peripheral use mode;
detecting a second input gesture from the first hand determined to be in the peripheral use mode; and
in accordance with a determination that the second input gesture is allowable during the peripheral use mode, processing a user input action associated with the second input gesture.

7. A non-transitory computer readable medium comprising computer readable code executable by one or more processors to:

obtain, from image sensor data, hand tracking data for a first hand in accordance with an indication of a peripheral event at a peripheral device;
detect an input gesture for the first hand based on characteristics of the hand tracking data, wherein the input gesture corresponds to an input action;
determine that characteristics of the hand tracking data for the first hand satisfy a peripheral use criterion based on a palm position of the first hand and a physical characteristic of a scene in which the first hand is located indicating that the hand is positioned proximate to a peripheral device; and
reject the input gesture by a user input pipeline in accordance with the determination that the peripheral use criterion is satisfied.

8. The non-transitory computer readable medium of claim 7, wherein the peripheral event is associated with the first hand, and further comprising computer readable code to:
determine that a relationship between the input gesture and the peripheral event satisfy a cancellation threshold,
wherein the input gesture is processed by the user input pipeline to disregard a user input action associated with the input gesture.

9. The non-transitory computer readable medium of claim 7, wherein the input gesture is rejected based on a finger pose of the first hand.

10. The non-transitory computer readable medium of claim 9, further comprising:
obtaining sensor data capturing the first hand; and
applying the sensor data to a hand classifier trained to predict a peripheral use mode classification based on sensor data comprising the first hand.

11. The non-transitory computer readable medium of claim 7, further comprising computer readable code to:
detect a hand movement of the first hand;
determine whether the hand movement satisfies a cancellation threshold; and
in accordance with a determination that the hand movement satisfies the cancellation threshold, determine that the first hand is in a gesture input mode,
wherein input gestures by the first hand detected during the gesture input mode are processed by the user input pipeline.

12. The non-transitory computer readable medium of claim 7, further comprising computer readable code to:
determine a second hand pose for the first hand;
determine, based on the second hand pose, that the first hand is in a peripheral use mode;
detect a second input gesture from the first hand determined to be in the peripheral use mode; and
in accordance with a determination that the second input gesture is allowable during the peripheral use mode, process a user input action associated with the second input gesture.

13. A system comprising:
one or more processors; and
one or more computer readable media comprising computer readable code executable by the one or more processors to:
obtain, from image sensor data, hand tracking data for a first hand in accordance with an indication of a peripheral event at a peripheral device;
detect an input gesture for the first hand based on characteristics of the hand tracking data, wherein the input gesture corresponds to an input action;

determine that characteristics of the hand tracking data for the first hand satisfy a peripheral use criterion based on a palm position of the first hand and a physical characteristic of a scene in which the first hand is located indicating that the hand is positioned proximate to a peripheral device; and reject the input gesture by a user input pipeline in accordance with the determination that the peripheral use criterion is satisfied.

14. The system of claim 13, wherein the peripheral event is associated with the first hand, and further comprising computer readable code to:

determine that a relationship between the input gesture and the peripheral event satisfy a cancellation threshold, wherein the input gesture is processed by the user input pipeline to disregard a user input action associated with the input gesture.

15. The system of claim 13, wherein the input gesture is rejected based on a finger pose of the first hand.

16. The system of claim 15, further comprising:

obtaining sensor data capturing the first hand; and
applying the sensor data to a hand classifier trained to predict a peripheral use mode classification based on sensor data comprising the first hand.

17. The system of claim 13, further comprising computer readable code to:

detect a hand movement of the first hand;
determine whether the hand movement satisfies a cancellation threshold; and
in accordance with a determination that the hand movement satisfies the cancellation threshold, determine that the first hand is in a gesture input mode, wherein input gestures by the first hand detected during the gesture input mode are processed by the user input pipeline.

* * * * *